United States Patent [19]
Klar et al.

[11] 4,080,759
[45] Mar. 28, 1978

[54] GRINDING MACHINE

[75] Inventors: John Klar, West Boylston; Robert H. Lizotte, Leominster, both of Mass.

[73] Assignee: Cincinnati Milacron-Heald Corporation, Worcester, Mass.

[21] Appl. No.: 720,890

[22] Filed: Sep. 7, 1976

Related U.S. Application Data

[60] Continuation of Ser. No. 579,915, May 22, 1975, abandoned, which is a continuation of Ser. No. 466,272, May 2, 1974, abandoned, which is a division of Ser. No. 238,395, Mar., 1972, Pat. No. 3,820,287.

[51] Int. Cl.² ............................................. B24B 51/00
[52] U.S. Cl. .............................. 51/165 R; 51/165.74; 361/415
[58] Field of Search ........... 51/165 R, 165.71, 165.72, 51/165.74, 165.79; 318/162, 571; 317/101 DH; 340/381

[56] References Cited

U.S. PATENT DOCUMENTS

| 3,341,980 | 9/1967 | Klar | 51/165.9 |
| 3,456,396 | 7/1969 | Hunt | 51/165.77 |
| 3,766,550 | 10/1973 | Vandemore | 317/101 DH |

Primary Examiner—Harold D. Whitehead
Attorney, Agent, or Firm—Norman S. Blodgett; Gerry A. Blodgett

[57] ABSTRACT

Grinding machine with a provision for setting up grinding cycle parameters and then locking them in the selected condition so that they are not accessible to the normal operator. The control is provided with lamps to indicate machine events and event failure.

1 Claim, 52 Drawing Figures

| FIG.3_A_ | FIG.3_F_ | FIG.3_K_ |
|---|---|---|
| FIG.3_B_ | FIG.3_G_ | FIG.3_L_ |
| FIG.3_C_ | FIG.3_H_ | FIG.3_M_ |
| FIG.3_D_ | FIG.3_I_ | FIG.3_N_ |
| FIG.3_E_ | FIG.3_J_ | FIG.3_O_ |

FIG.3

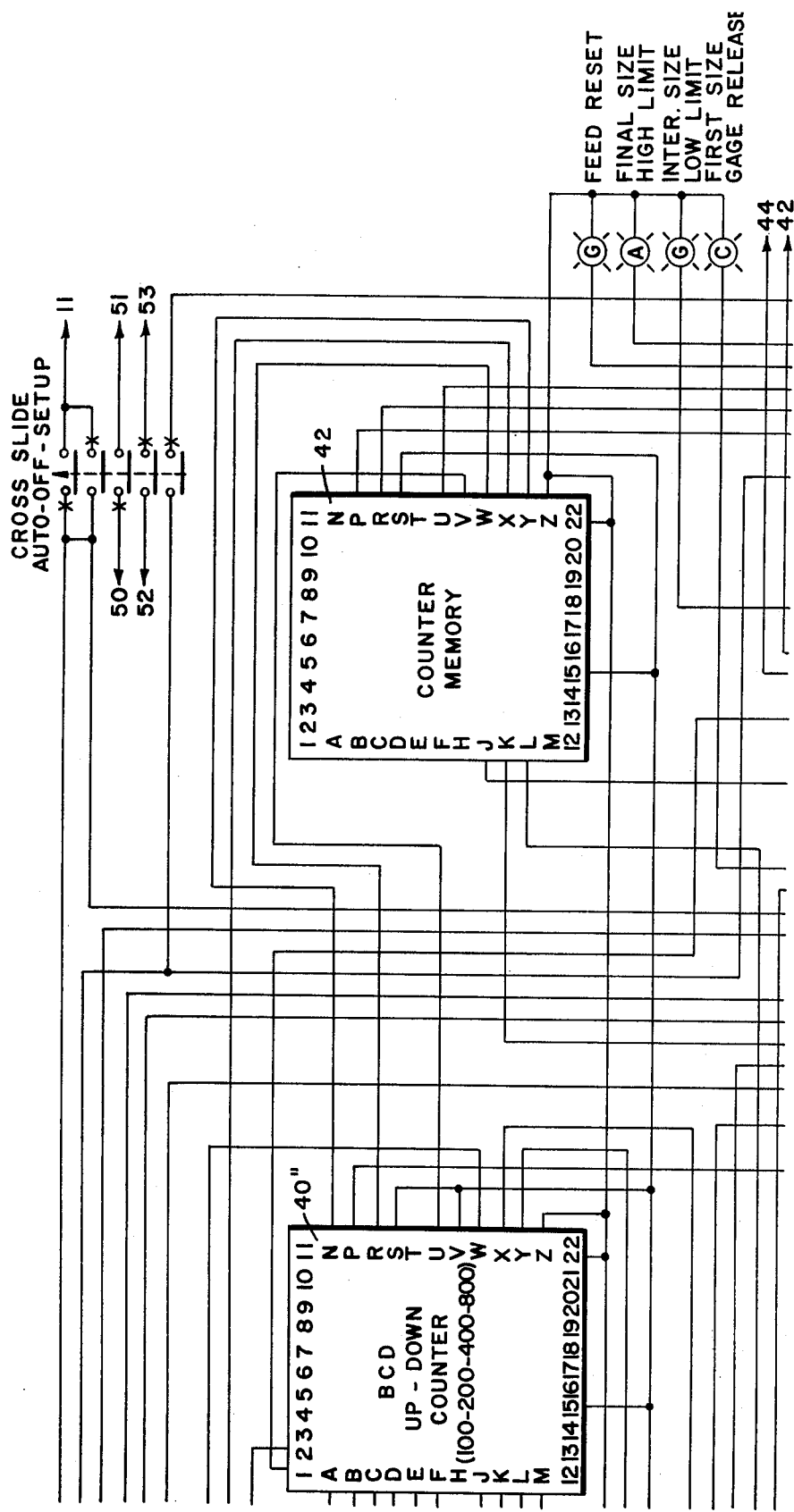

FIG.8 RESISTOR DECADE BANKS

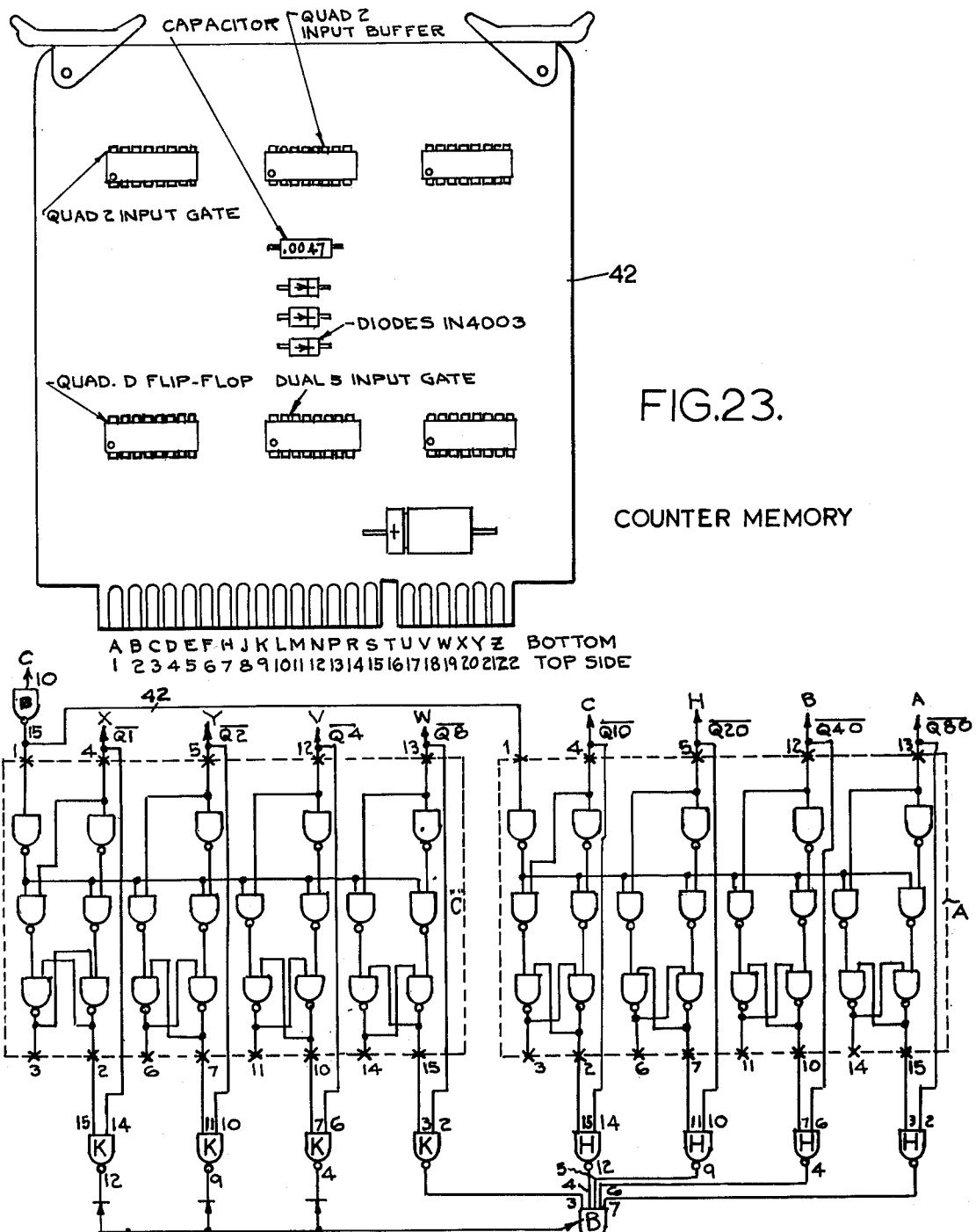

POWER SUPPLY

INPUT INTERFACE

GRINDING MACHINE

This is a continuation, of application Ser. No. 579,915 filed May 22, 1975, now abandoned, which is a continuation of application Ser. No. 466,272 filed May 2, 1974, now abandoned, which in turn was a division of patent application Ser. No. 238,395 filed Mar. 27, 1972, now U.S. Pat. No. 3,820,287.

BACKGROUND OF THE INVENTION

In a modern grinding machine, particularly one for generating an internal surface of revolutions in a workpiece, controls are provided for not only selecting the particular type of grinding cycle, i.e. the particular functions which are to take place during the grinding cycle, but also controls are provided for setting the magnitude of such parameters or functions. Such a machine, during the grinding cycle, may use functions such as LOW FEED-BACK LIMIT, HIGH FEED-BACK LIMIT, SECOND SIZE, RATE #1, RATE #2, NEW WHEEL COMPENSATION, STANDARD COMPENSATION, FIRST SIZE RETRACTION, SECOND SIZE RETRACTION, ROUGH SPARK-OUT TIME, FINISH SPARK-OUT TIME, FINISHING TIME, and LOW-FORCE TIME. In order to perform a particular grinding operation on a particular type of workpiece, an operator called a "set-up man" operates the machine and adjusts these parameters to the point where a perfect workpiece is produced. The machine is then turned over to the normal operator who may run a large number of workpieces through the machine sequentially. Each grinding cycle on a particular workpiece will be determined by the way that these parameters have been determined by the set-up man. Unfortunately, many machine operators feel that they should adjust the dials and setting for these parameters and usually this adjustment or changing of the setting eventually results in the production of poor workpieces. It is then necessary for a maintenance man or a set-up man be sent to the machine to set the machine to operate properly again. Attempts to stop the operator from changing the settings by covering the dials with doors and windows have been less than successful, since the operator (once he knows that the adjustment means is available) simply forces the doors open or breaks the machinery in order to get at the parameter adjustment means. These and other difficulties experienced with the prior art devices have been obviated in a novel manner by the present invention.

It is, therefore, an outstanding object of the invention to provide a grinding machine having adjustable parameter elements, and having means for rendering the adjustable parameter elements inoperative, while retaining the parameter values to which the elements have been set.

Another object of this invention is the provision of a grinding machine, which after setup, cannot have its grinding parameters changed by the operator.

A further object of the present invention is the provision of a grinding machine whose feed takes place in response to electrical pulses which pulses are controlled by logic circuitry mounted on printed circuit boards, and wherein, the insertion of a first board causes operator-controlled parameter adjustable elements to become operative and the insertion of a second circuit board renders them inoperative, but substitutes fixed elements for them.

SUMMARY OF THE INVENTION

Generally, the invention consists of a grinding machine for generating a surface of revolution on a workpiece by the use of an abrasive wheel, the machine having a base, having a workhead mounted on the base for supporting and rotating the workpiece about the axis of the surface of revolution, and having a wheelhead mounted on the base for supporting and rotating the abrasive wheel about its axis. A feed box is provided containing electrical circuitry for controlling movement of the workhead and wheelhead both parallel to and perpendicular to the said axis of the surface of the revolution, in accordance with predetermined grinding parameters to produce a grinding cycle, the circuitry containing adjustable elements for setting the said parameters. A first circuit board is insertable in the feed box to render the said adjustable elements operative and a second circuit board is insertable in the feed box to render the said adjustable elements inoperative and to substitute in the said electrical circuitry fixed elements in place of the adjustable elements.

More specifically, the second circuit board is insertable in the feed box in place of the first circuit board and the electrical circuitry is rendered normally inaccessible. The adjustable elements, however, are always accessible, irrespective of wheher they are operative or inoperative. The adjustable elements consist of resistors whose resistance can be adjusted in discrete steps. The fixed elements can be readily changed to have values corresponding to values to which the resistance of the adjustable elements have been adjusted.

BRIEF DESCRIPTION OF THE DRAWINGS

The character of the invention, however, may be best understood by reference to one of its structural forms, as illustrated by the accompanying drawings, in which:

FIG. 23 is a front elevational view of a circuit board used in FIGS. 3K and 3L, FIG. 24 shows the electrical circuitry shown used in the circuit board of FIG. 23.

DESCRIPTION OF THE PREFERRED EMBODIMENT

Figure 1:
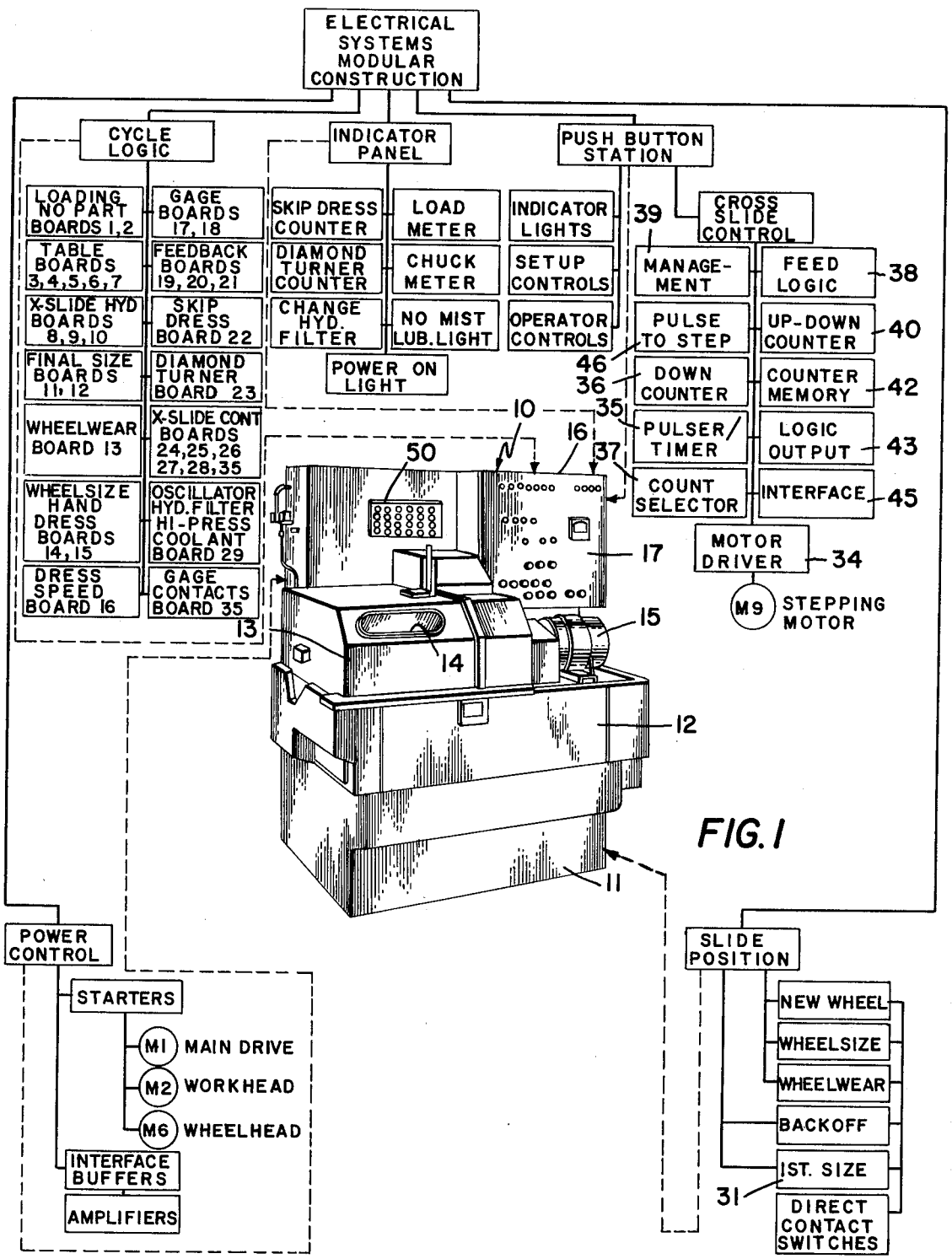
FIG. 1 is a perspective view of a grinding machine embodying the principles of the present invention.

Referring first to FIG. 1, which best shows the general features of the invention, the grinding machine, indicated generally by the reference numeral 10, is shown as being of the type shown and described in the patent of Uhtenwoldt et al U.S. Pat. No. 3,593,463 which issued on July 20, 1971. It is provided with a base 11 adapted to rest on a machine shop floor and on which the other elements of the machine are mounted. Extending around the base is an apron 12 to protect the operator from spray and the like. Overlying the apron is a cover 13, having a window 14 through which can be seen operative elements of the machine. Exposed above the apron is a wheelhead motor 15. Extending upwardly from the base rearwardly of that motor is a control box 16, having at the front of it a control panel 17 and a display panel 50.

Mounted on the base 11 under the cover 13 is a workhead arranged for sliding motion transversely of the base, and a wheelhead arranged for motion longitudinally of the base. The workhead has a rotary spindle driven by a motor adapted to carry a workpiece. The transverse feed motion of the table is provided by a cylinder which receives hydraulic fluid from a valve, the hydraulic pressure originating in a power unit. The wheelhead is driven by the motor 15 and has a spindle carrying in its outer end an abrasive wheel. A hydraulic cylinder provides for longitudinal movement of the wheelhead, while an oscillator provides for short reciprocations of the wheel in the workpiece while grinding. The details in the manner in which the grinding wheel is constructed are shown and described in the patent of Robillard et at U.S. Pat. No. 3,503,158 which issued on Mar. 31, 1970. Fundamentally, as shown in that patent, the crossfeed takes place at certain times in the grinding cycle under the influence of a hydraulic cylinder for controlled force grinding and at other parts of the cycle by a feed rate (controlled rate) system making use of a stepping motor receiving electrical pulses for its energization. In this respect it is similar to the construction shown and described in the patent of Robillard et al U.S. Pat. No. 3,503,158 which issued on Mar. 31, 1970.

Figure 2:
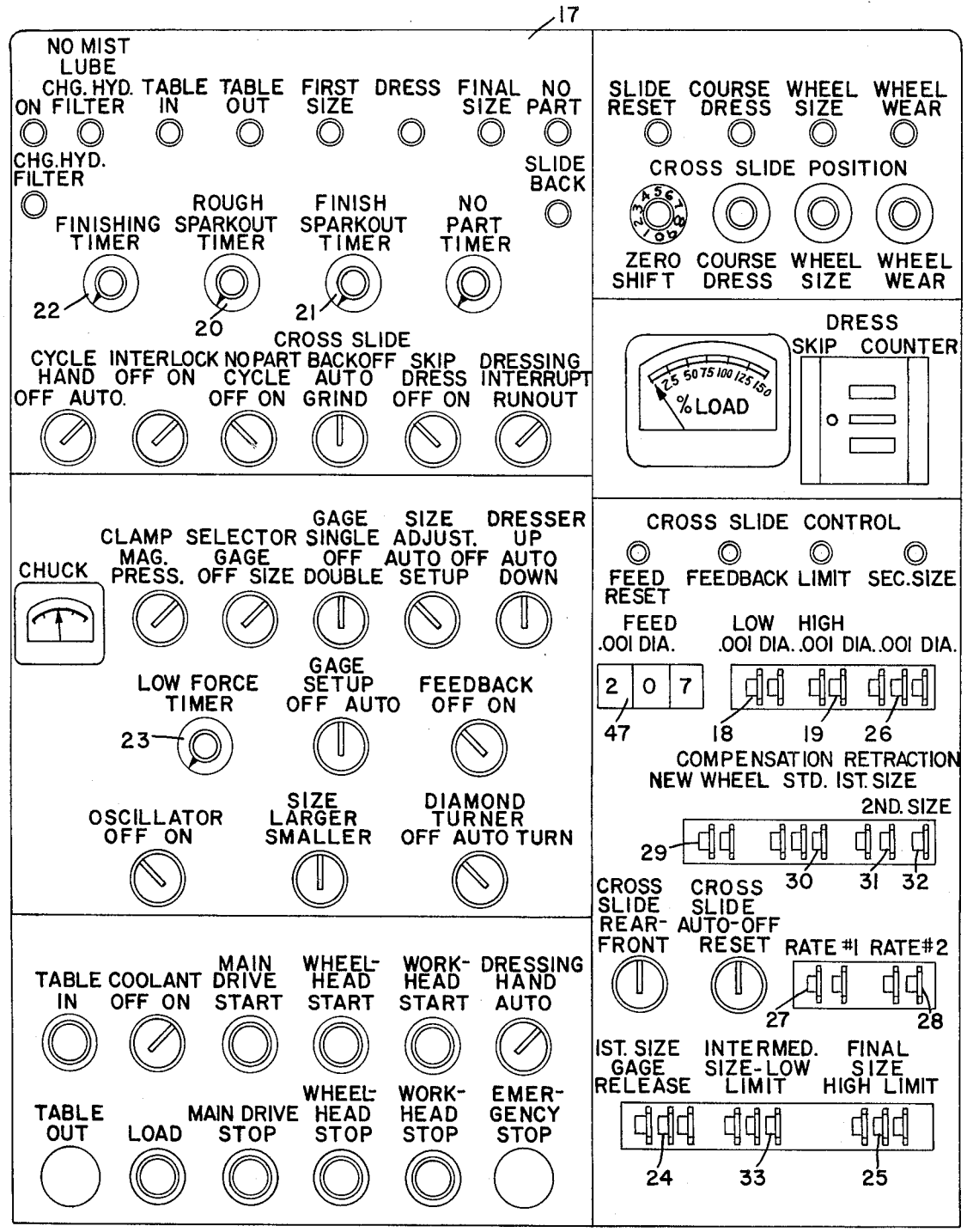
FIG. 2 is a front elevational view of a control panel forming part of the grinding machine.

Referring now to FIG. 2, it can be seen that the machine is provided with all of the usual function switches and setting devices, as well as indicators. It includes adjustable elements for adjusting all the conceivable functions that may be used in the machine. They include the following:

FEED-BACK LIMIT-LOW adjusting element 18
FEED-BACK LIMIT-HIGH adjusting element 19
ROUGH SPARK-OUT TIME adjusting element 20
FINISH SPARK-OUT TIME adjusting element 21
FINISHING TIME adjusting element 22
LOW-FORCE TIME adjusting element 23
FIRST-SIZE GAUGE RELEASE adjusting element 24
FINAL-SIZE HIGH LIMIT adjusting element 25
SECOND-SIZE adjusting element 26
RATE #1 adjusting element 27
RATE #2 adjusting element 28
NEW WHEEL COMPENSATION adjusting element 29
STANDARD COMPENSATION adjusting element 30
FIRST-SIZE RETRACTION adjusting element 31
SECOND-SIZE RETRACTION adjusting element 32
INTERMEDIATE SIZE-LOW LIMIT adjusting element 33

Some of the adjusting elements are adjustable potentiometers; this is true in the case of the FINISH-TIME adjusting element 22, the ROUGH SPARK-OUT TIME adjusting element 20, the FINISH SPARK-OUT TIME adjusting element 21, and the LOW-FORCE TIME adjusting element 23. The other adjusting elements are of the digital switch type, in which rotation of the adjusting wheels causes incremental resistance change. In this respect the controls are similar to those shown and described in the patent of Robillard U.S. Pat. No. 3,561,168 which issued on Feb. 9, 1971 in which the settings of the various functions are compared resistancewise with the setting on a main slide position potentiometer and the result applied to operational amplifyers, which, in turn, close relays to set a particular function in operation.

FIG. 3 and its associated figures, FIG. 3A through FIG. 30, show the various electrical inner-connections between circuit boards located in the interior of the control panel 17. FIG. 3 is used to indicate the manner in which FIGS. 3A through 3O can be arranged to show the complete circuit, which is too large to be shown in a single figure. FIGS. 3 through 32 show the details of construction of a grinding machine making use of a selected number of the functions which have been described above in connection with the adjusting elements 18 through 33. It will be understood that a similar selection and circuitry will be used for each particular machining using various functions selected from the large group available on the control panel 17. FIG. 3A, for instance, shows the connections to and from a circuit board 34 and a circuit board 35. FIG. 3B includes a circuit board 36 and a circuit board 37. FIG. 3C includes a circuit board 36' (which is exactly the same as the circuit board 36) and a circuit board 38. FIG. 3D shows the location of a management control board 39. FIG. 3E shows the location of the NEW WHEEL COMPENSATION adjusting element 29, the STANDARD COMPENSATION adjusting element 30, the FIRST-SIZE RETRACTION adjusting element 31, and the SECOND-SIZE RETRACTION adjusting element 32. FIG. 3F shows the connections to and from a circuit board 40, while FIG. 3G shows the connections to a circuit board $40^1$, which is exactly the same as the circuit board 40 in construction.

Figure 3A:
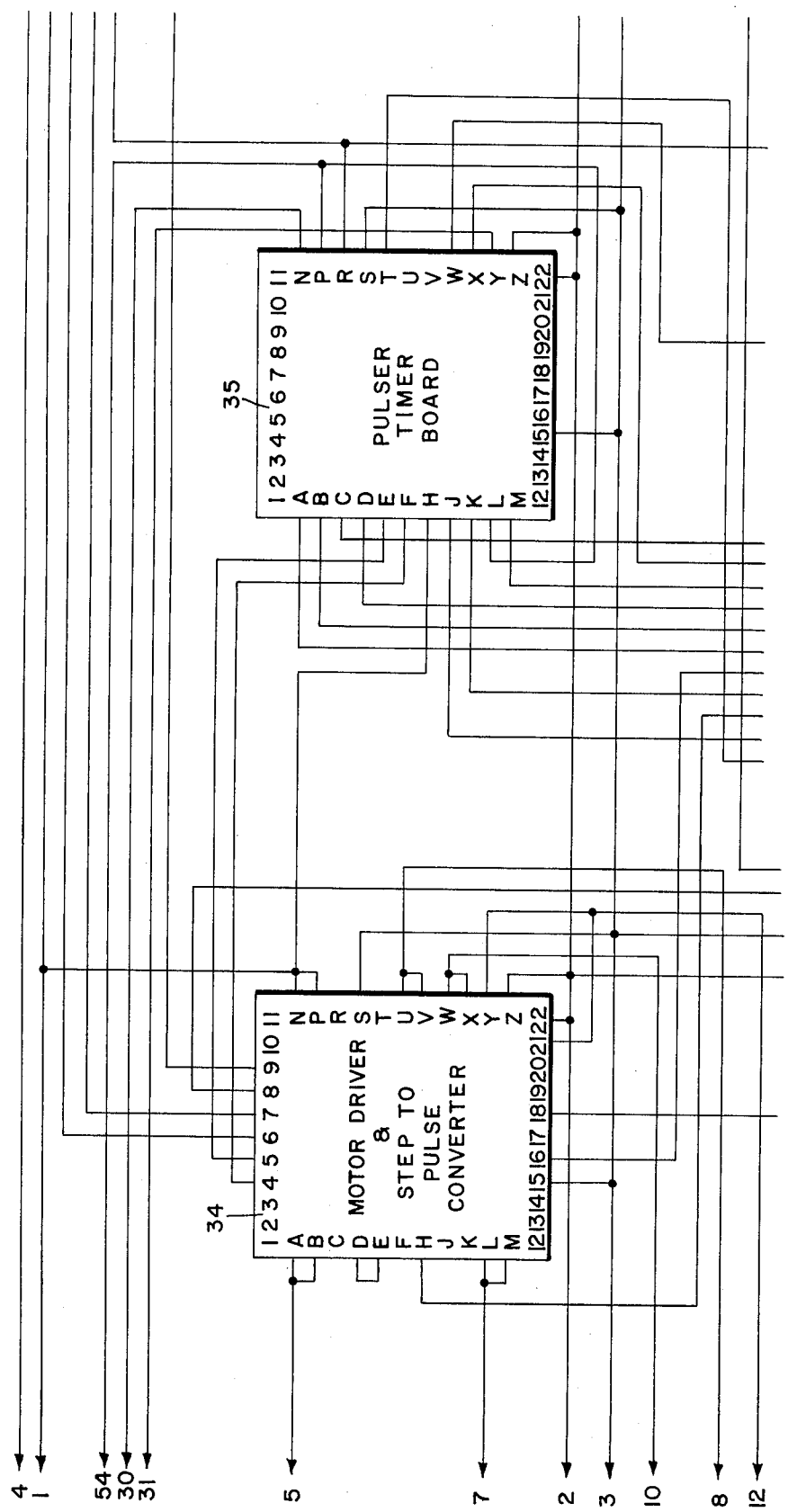
FIG. 3 is a diagram showing the relationship of portions of electrical circuitry used in the grinding machine, these portions being separately shown in FIGS. 3A to 30.
Figure 3B:
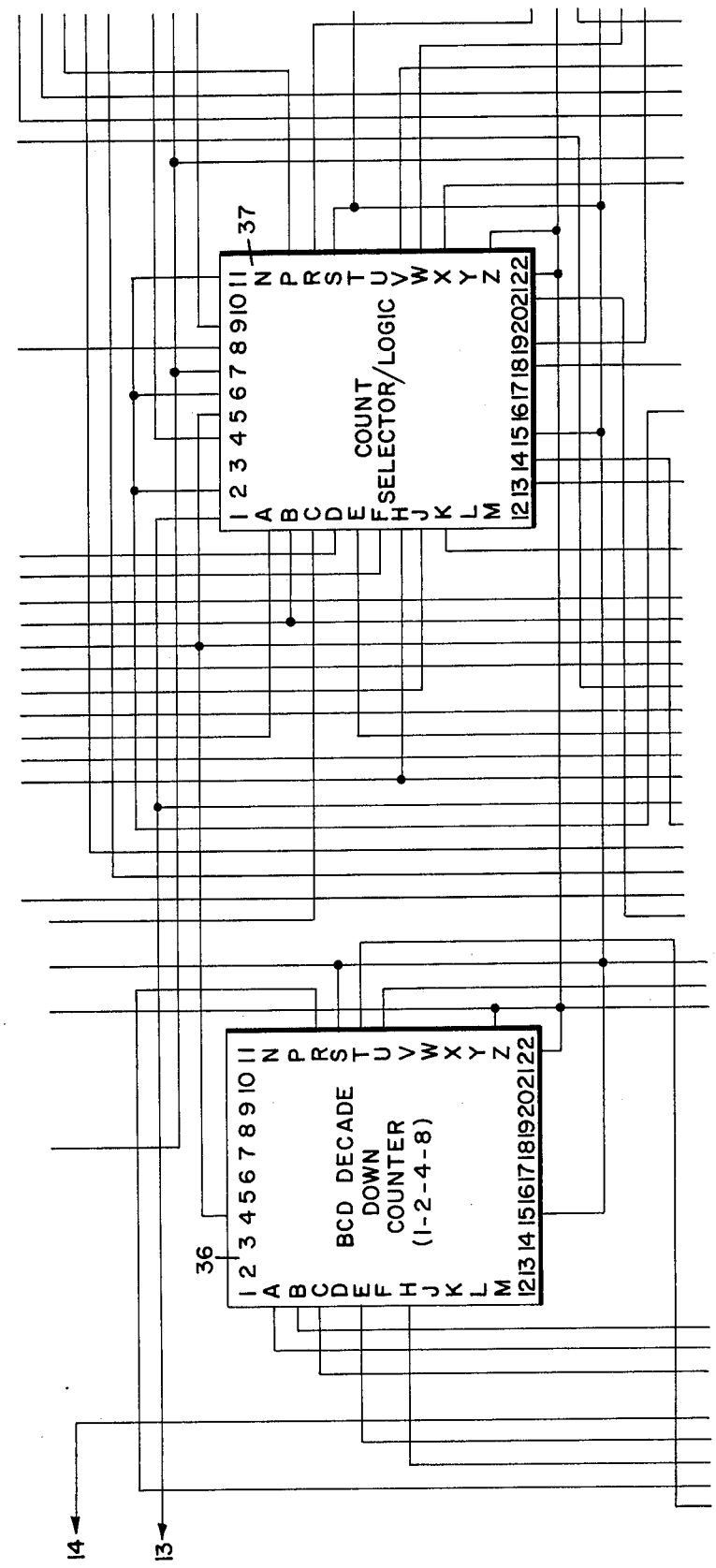
Figure 3C:
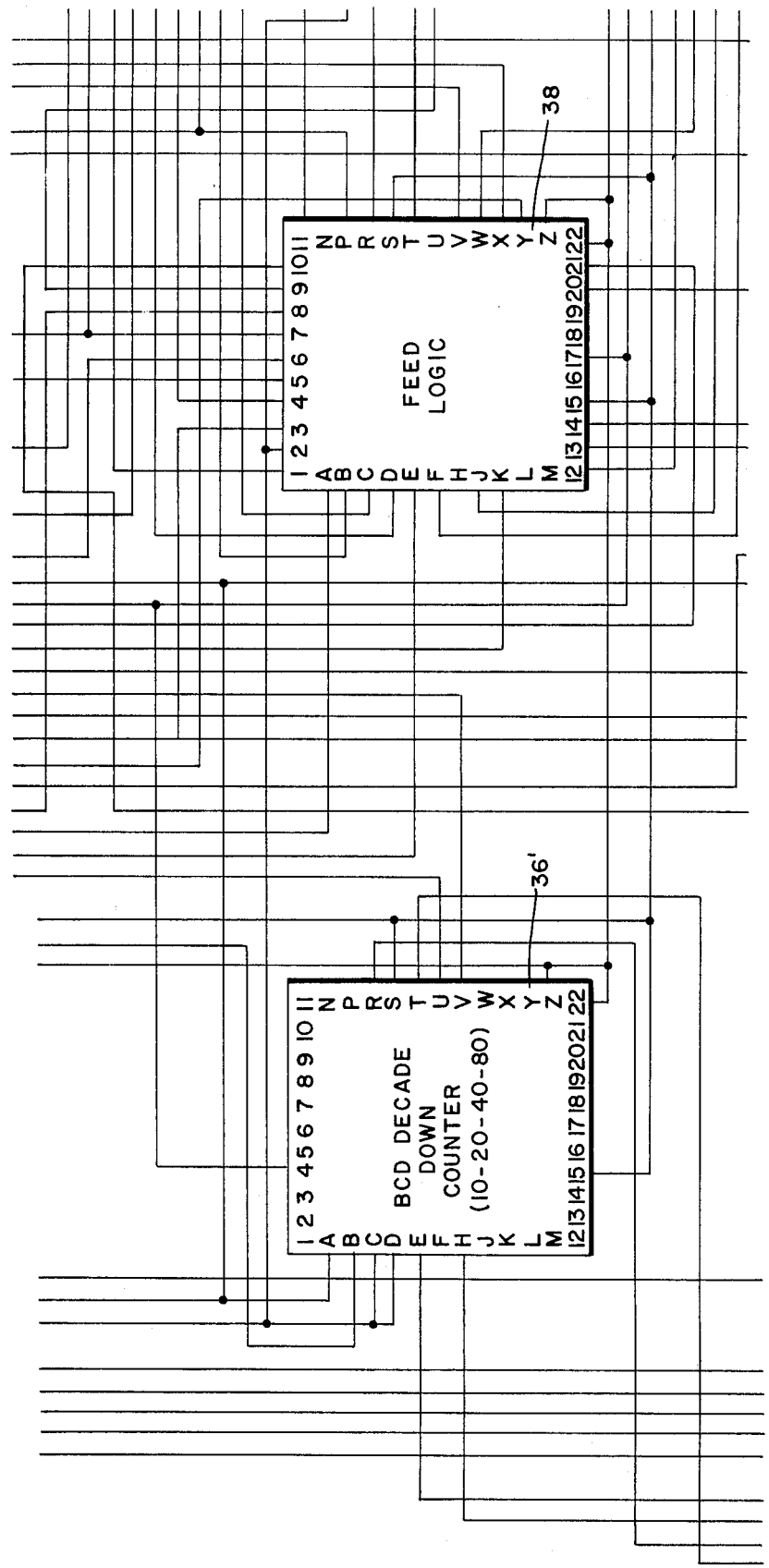
Figure 3D:
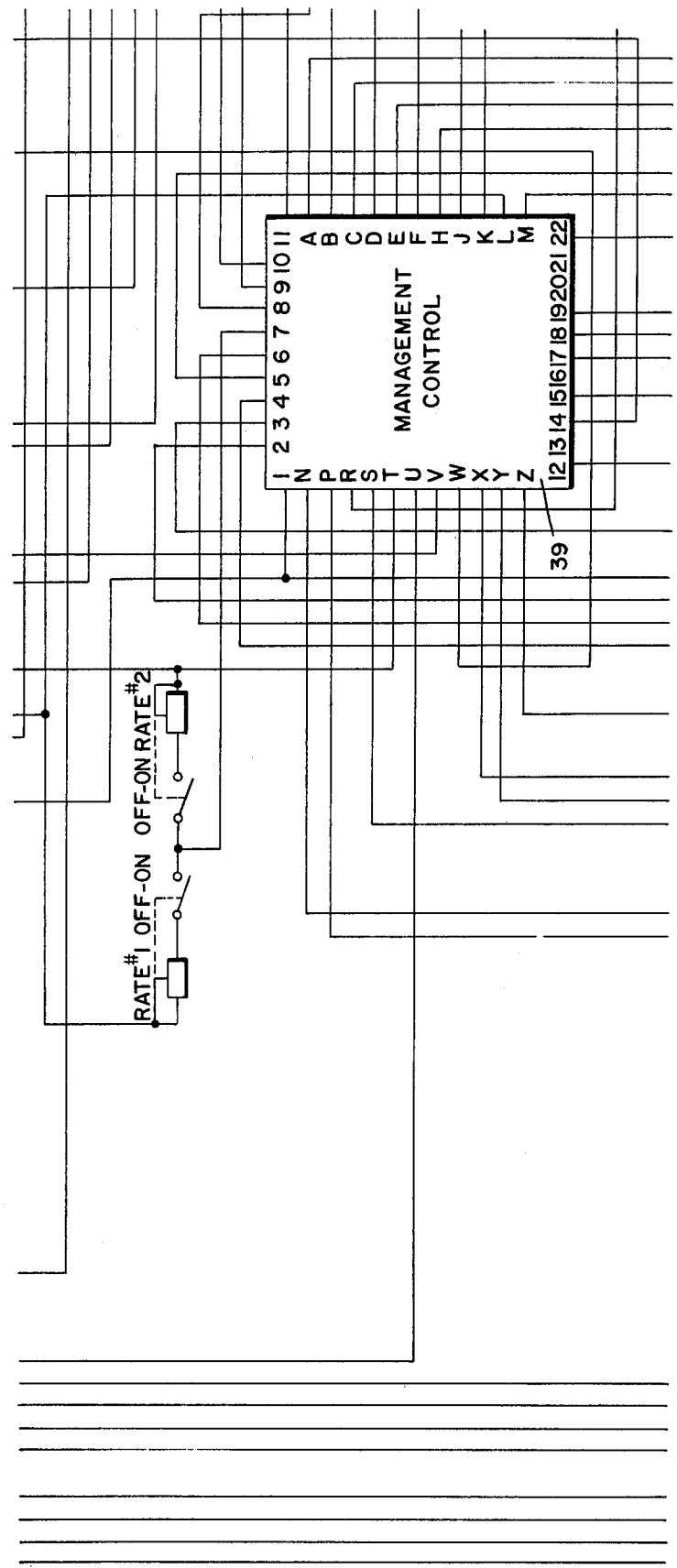
Figure 3E:
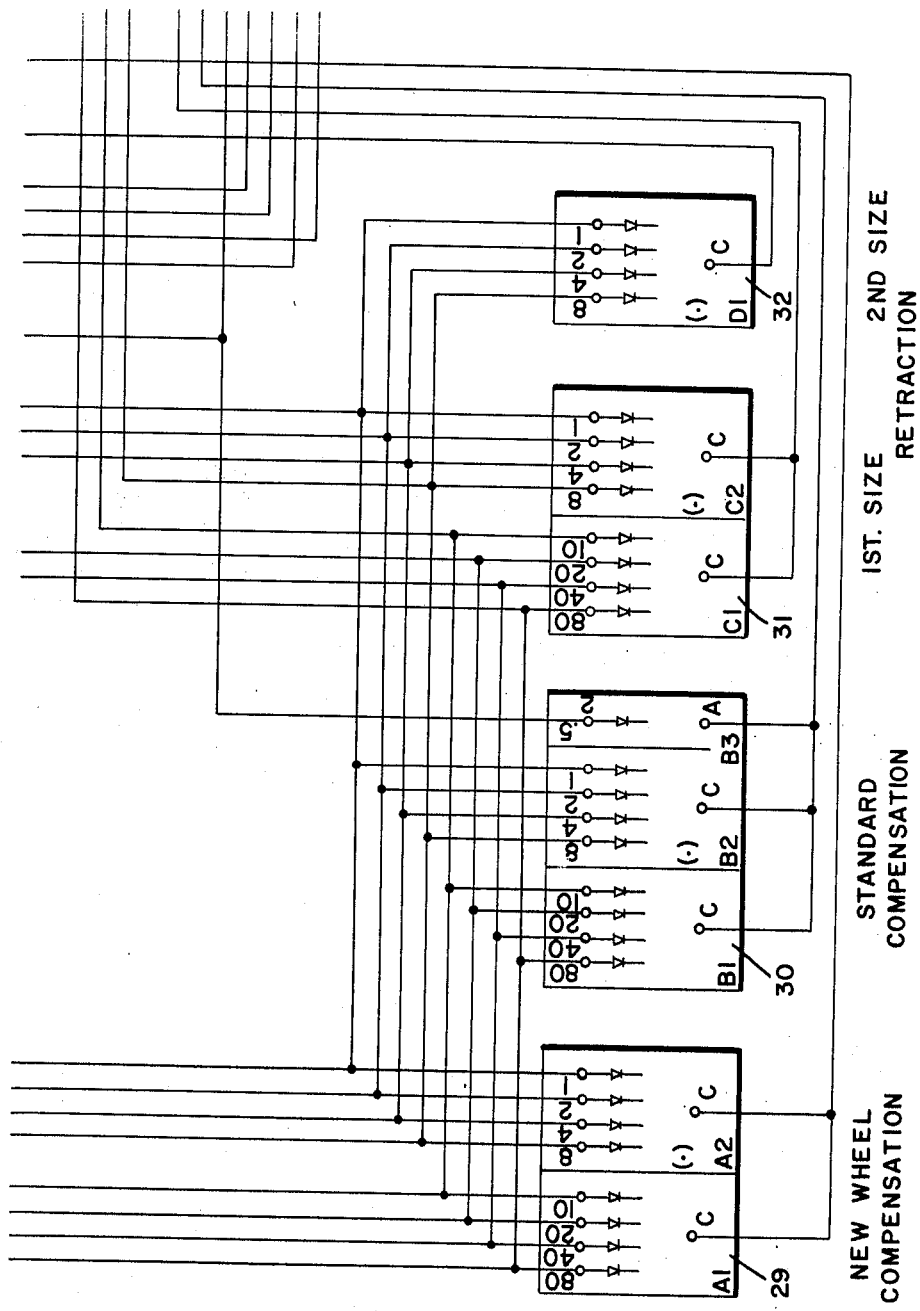
Figure 3F:
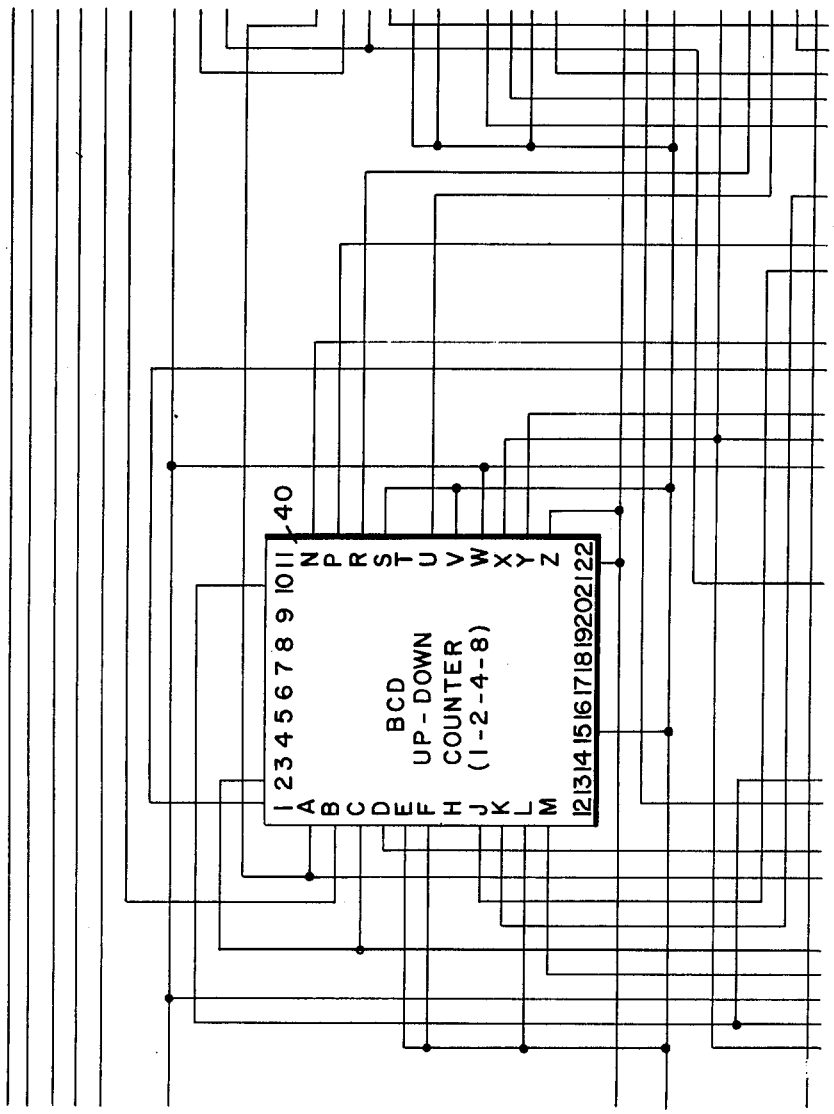
Figure 3G:
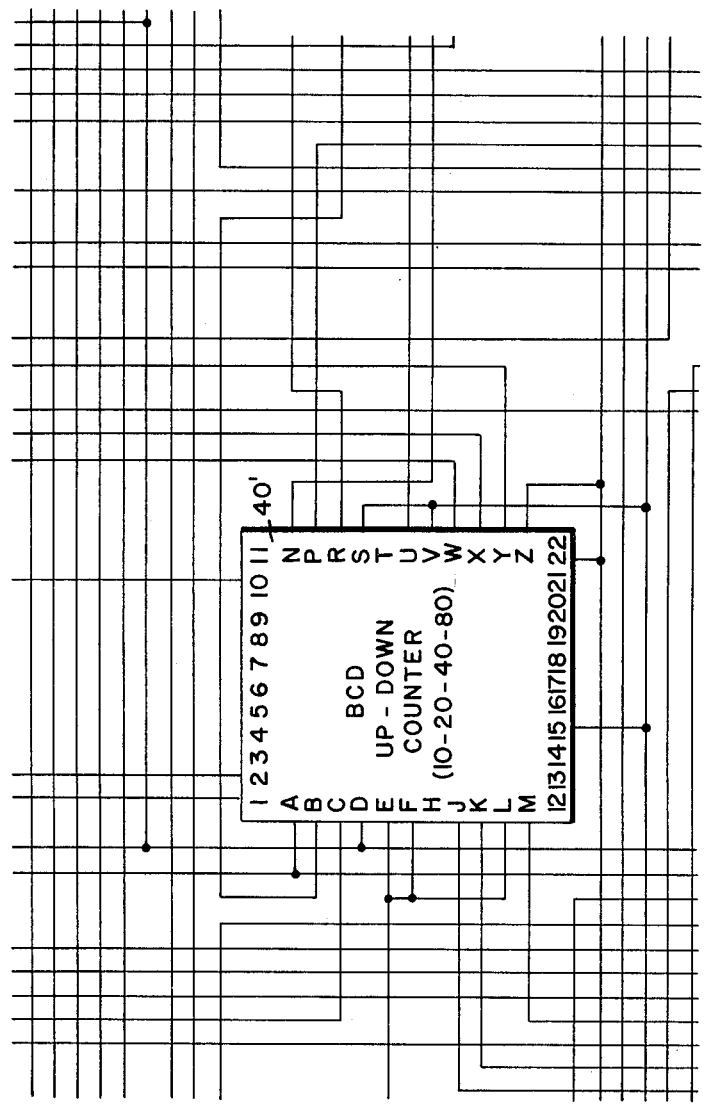
Figure 3H:
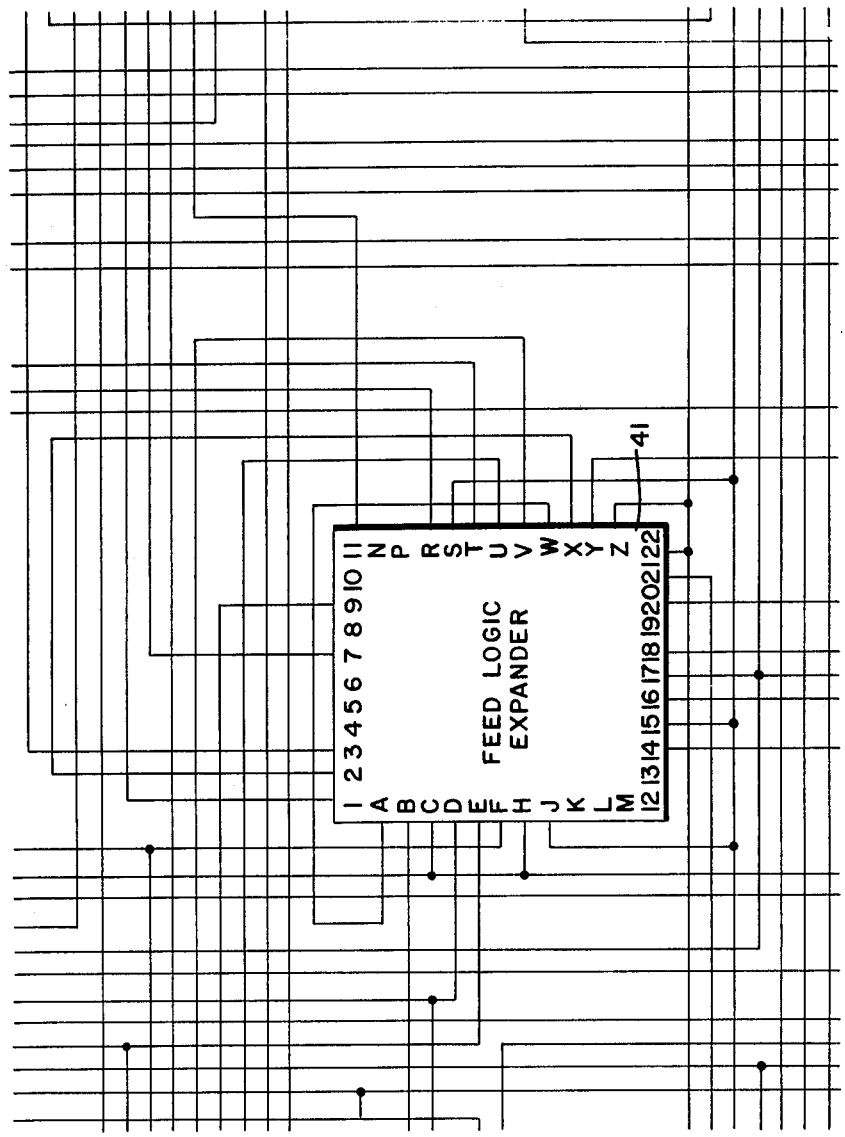
Figure 3I:
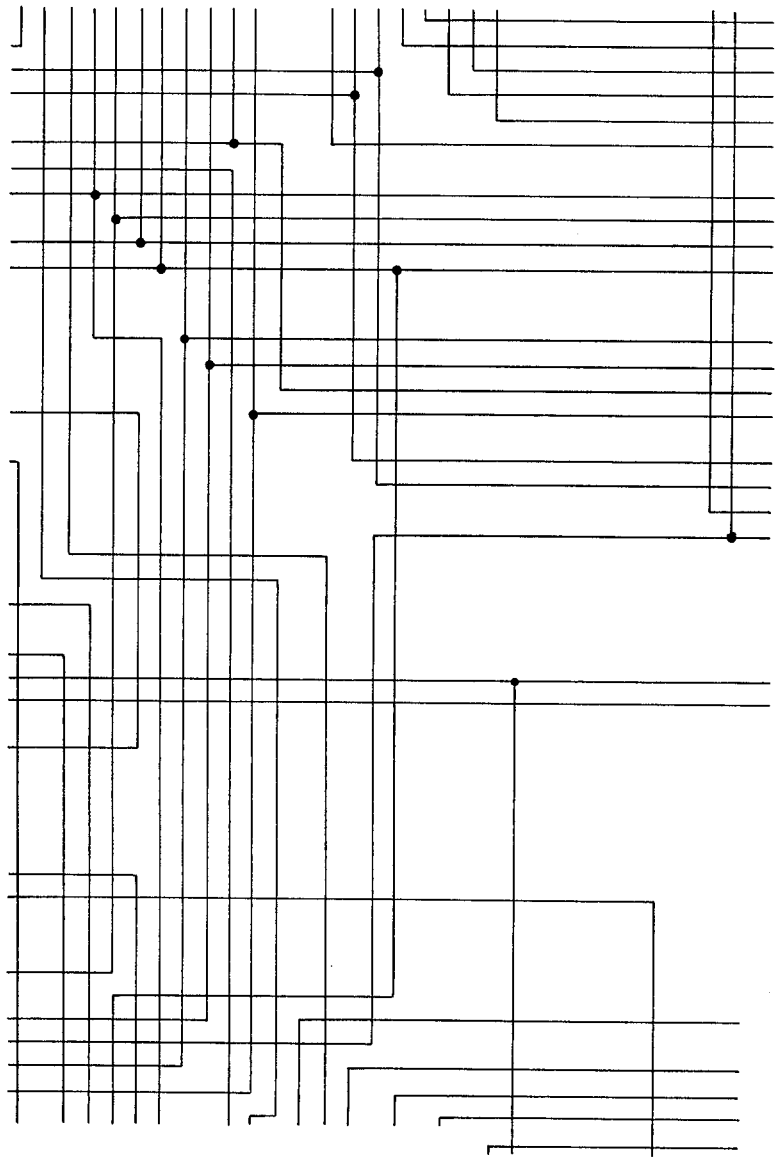
Figure 3J:
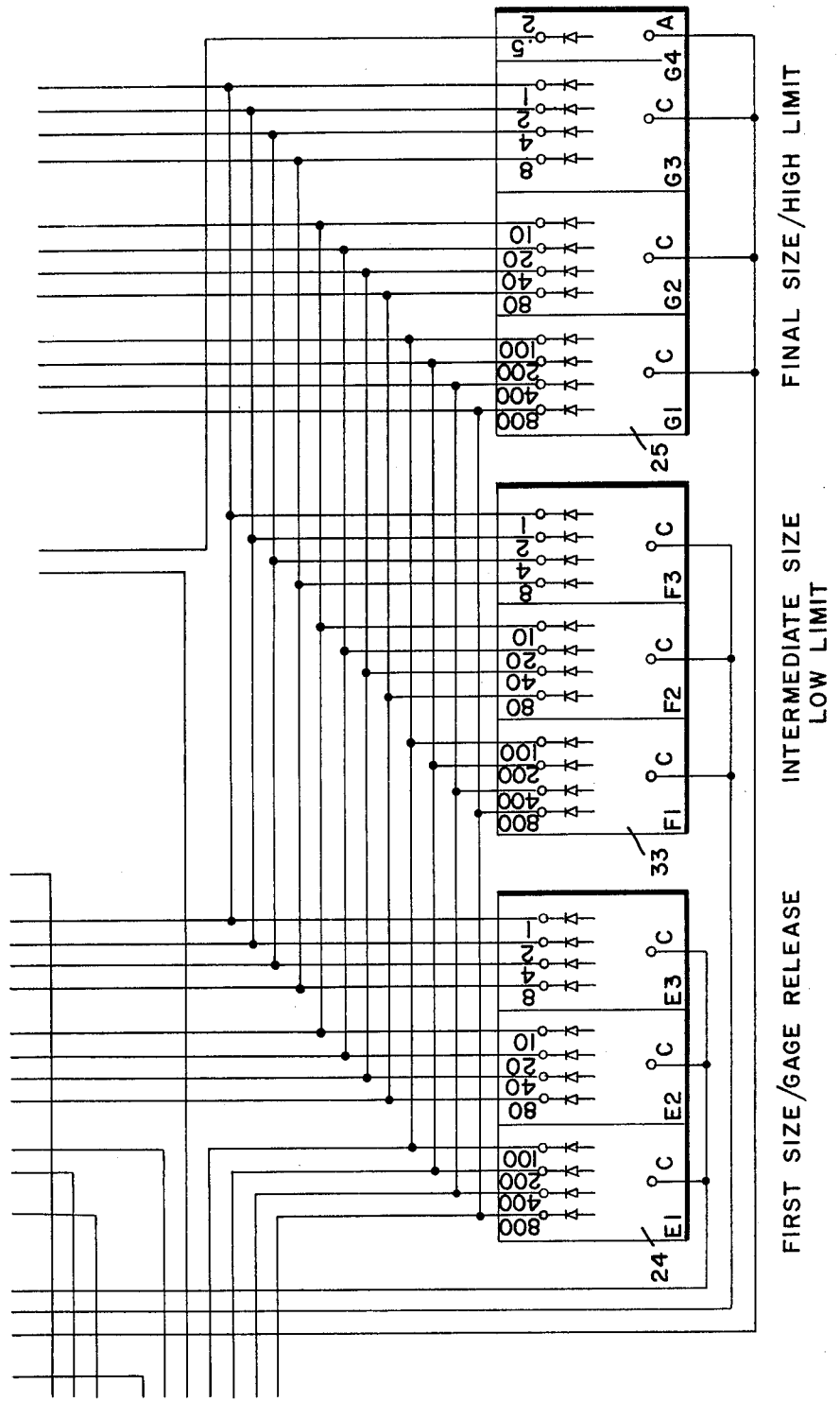
Figure 3L:
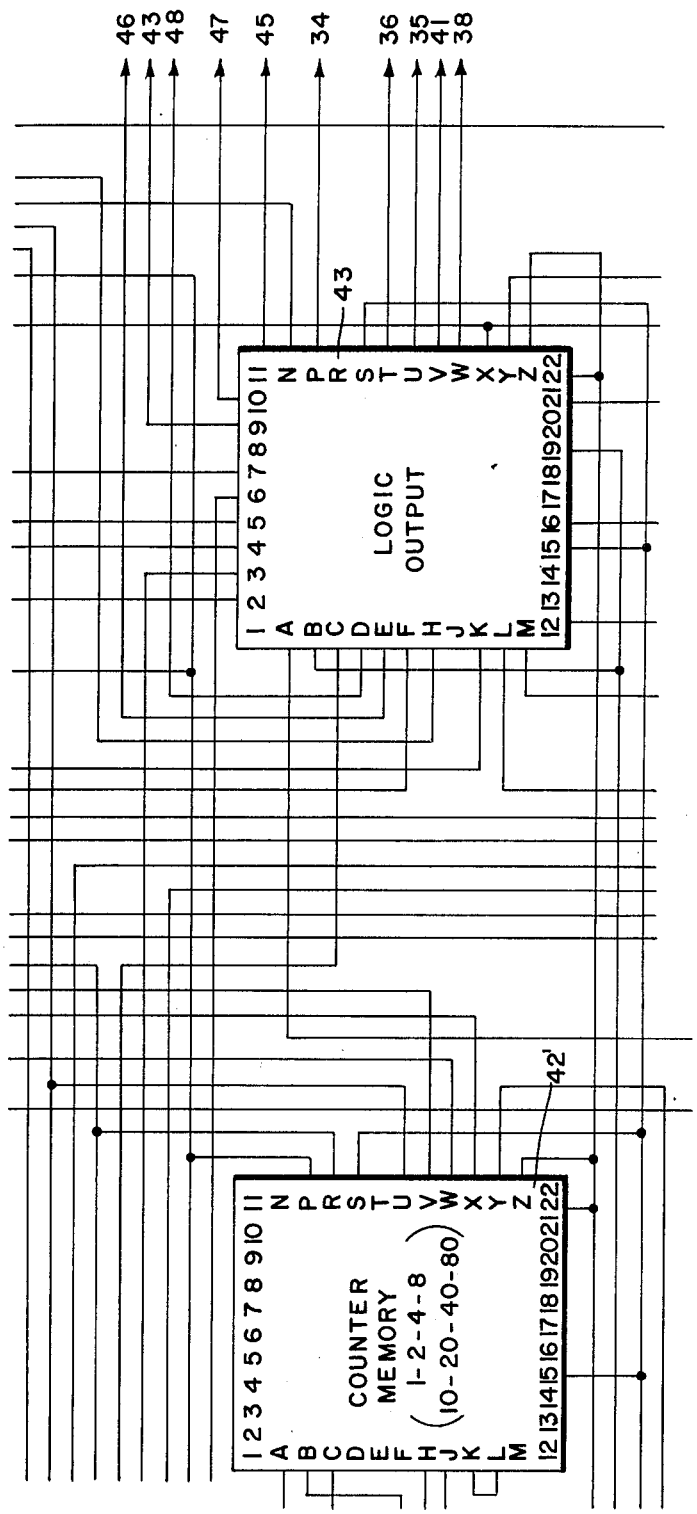
Figure 3M:
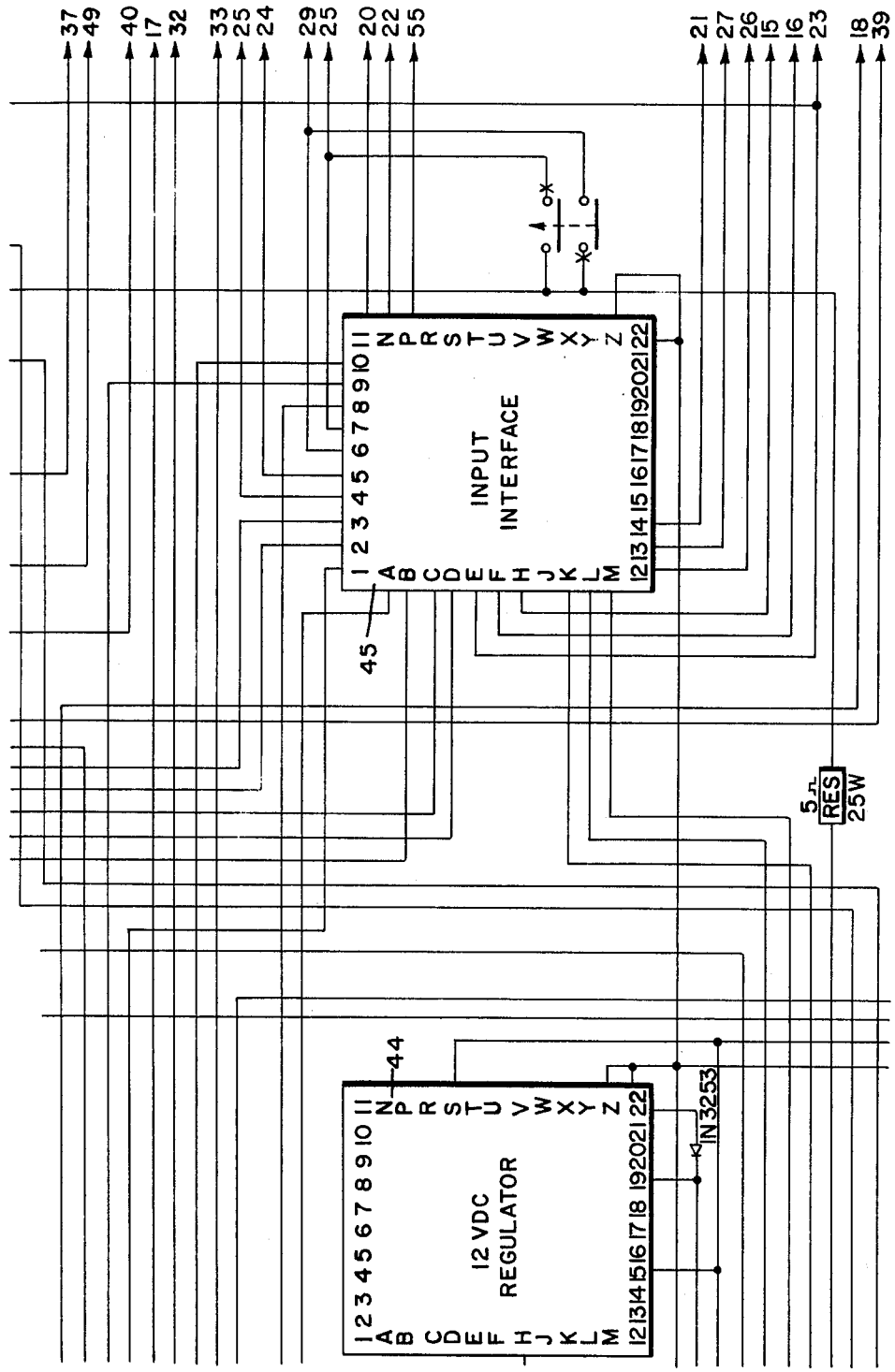
Figure 3N:
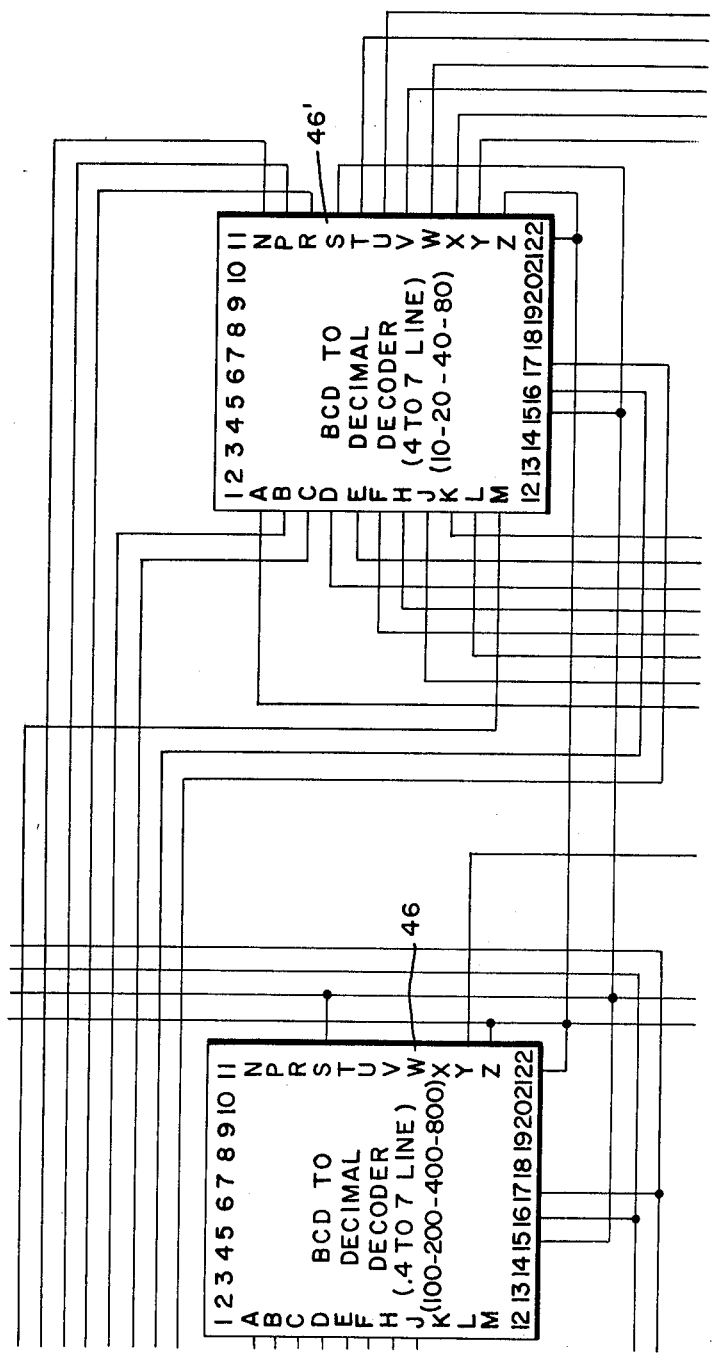

FIG. 3H shows the connections to a circuit board 41, while FIG. 3I shows no circuit boards but shows various interconnections going to the other portions of the circuit. FIG. 3J shows the connections to a FIRST-SIZE GAUGE RELEASE adjusting element 24, INTERMEDIATE SIZE-LOW LIMIT adjusting element 33, and the FINAL SIZE-HIGH LIMIT adjusting element 25. FIG. 3K shows the connections to circuit $40^2$ (which is similar in construction to the circuit board 40) and to a circuit board 42. FIG. 3L shows the connections to a circuit $42^1$ (which is similar construction to the circuit board 42) and to a circuit board 43. FIG. 3M shows the connection to and from a circuit board 44 and a circuit board 45. FIG. 3N shows the connections to and from a circuit board 46 and a circuit board $46^1$, both of which are similarly constructed. FIG. 3O shows the connections to a readout device 47 (see FIG. 2). FIG. 3 shows the various external connections to the operating parts of the grinding machine. These connections are the usual connections for producing longitudinal and transverse movement of the wheelhead and the workhead relative to the axis of the surface of revolution to be generated and are well known in the prior art and need not be described herein or specifically.

Figure 4:
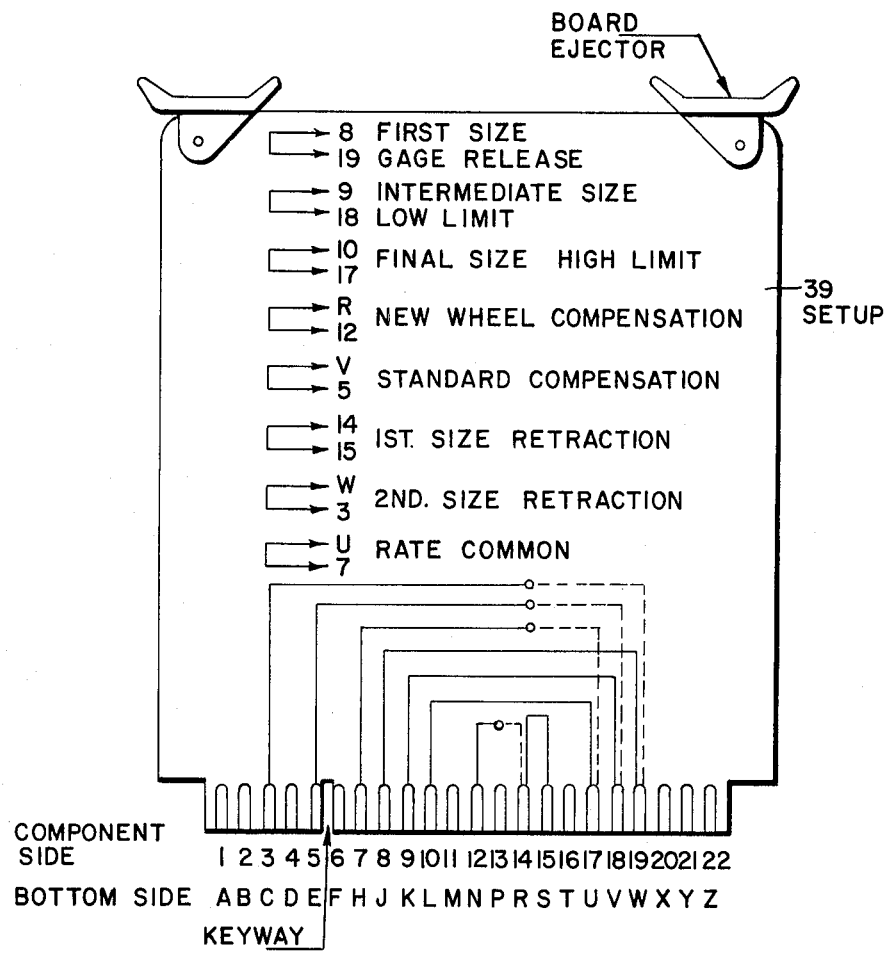
FIG. 4 is a front elevational view of a circuit board used in the grinding machine.
Figure 5:
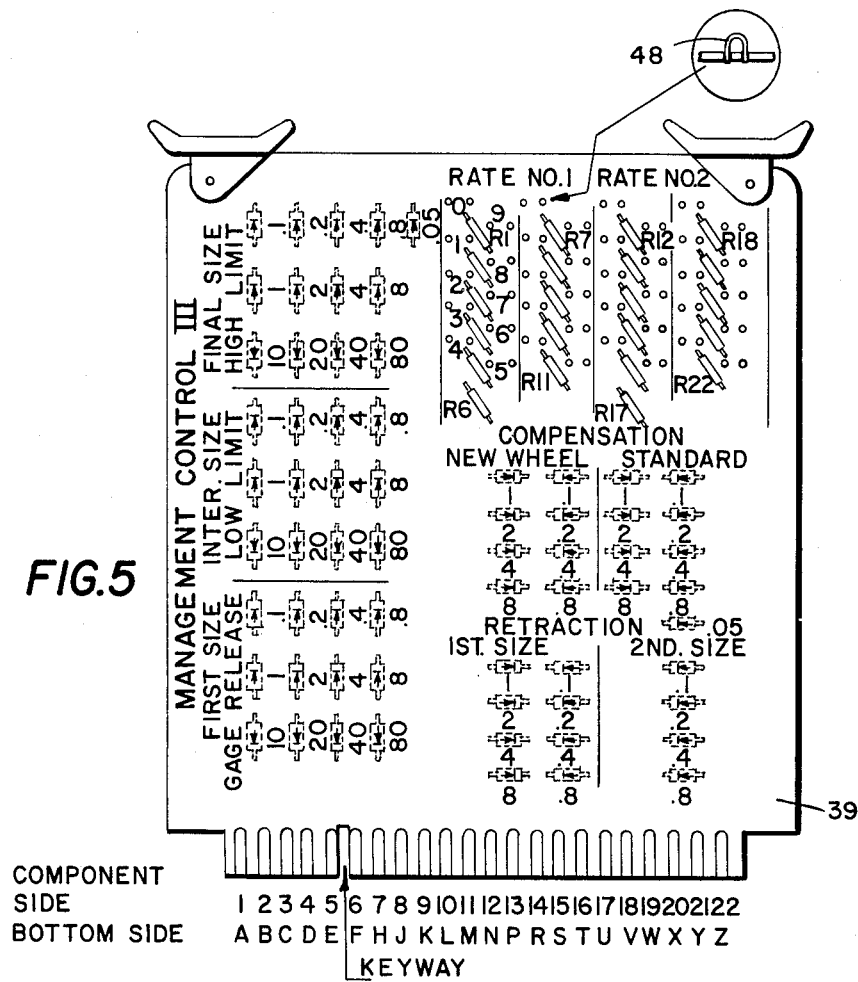
FIG. 5 is a front elevational view of a second circuit board used in the machine.
Figure 6:
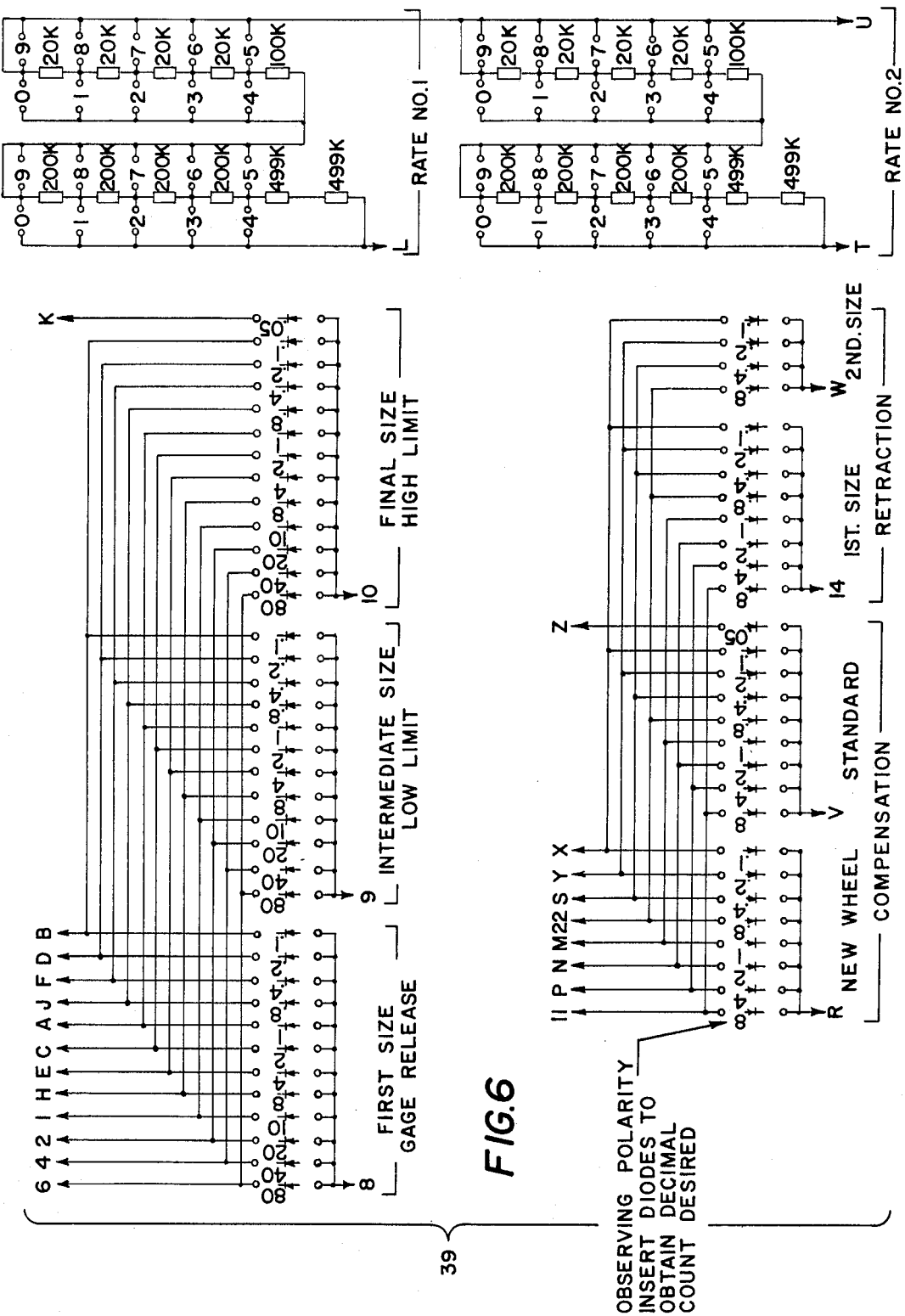
FIG. 6 shows electrical circuitry used in the circuit board of FIG. 5.

In FIG. 4 can be seen that a special circuit board 39 can be inserted by the set-up man into the circuitry shown in FIG. 3 and, when so inserted, renders the adjusting elements 29, 30, 31, 32, 24, 33, and 25 operative; this is used in setting up the machine after the setting for these adjustable elements has been determined, the setting is permanently fixed in the management control circuit board 39 which then takes its place in the circuit. The circuit board 39 shown in FIGS. 5 and 6 consists of a number of diodes and resisters which can be connected by a solid jumper wire 48 which is inserted into several socket holes formed in the circuit board which is of the printed circuit type. The circuit board 39 is used in conjunction with the circuit board $39^1$ (shown in FIGS. 7 and 8) to provide sets of resistors or diodes for connection in decades to match the resistance values or diodes configuration read off of the adjustable elements 29, 30, 31, 32, 24, 33, and 25 during set-up.

Figure 9:
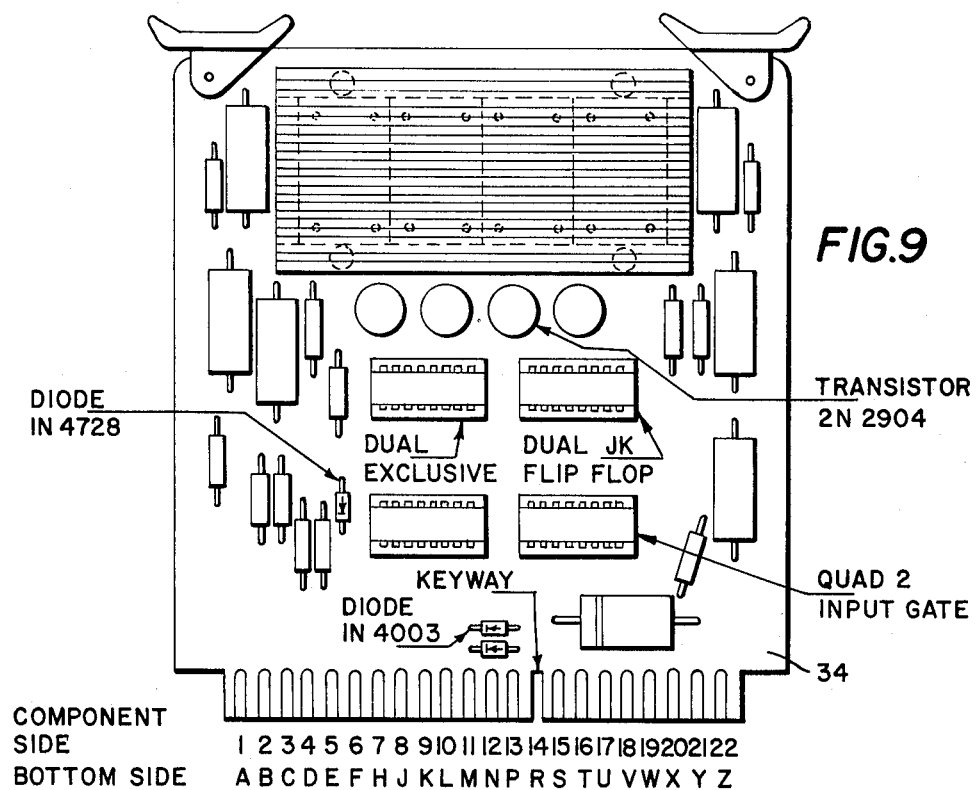
FIG. 9 is a front elevational view of a circuit board used in the electrical circuitry shown in FIG. 3B.
Figure 10:
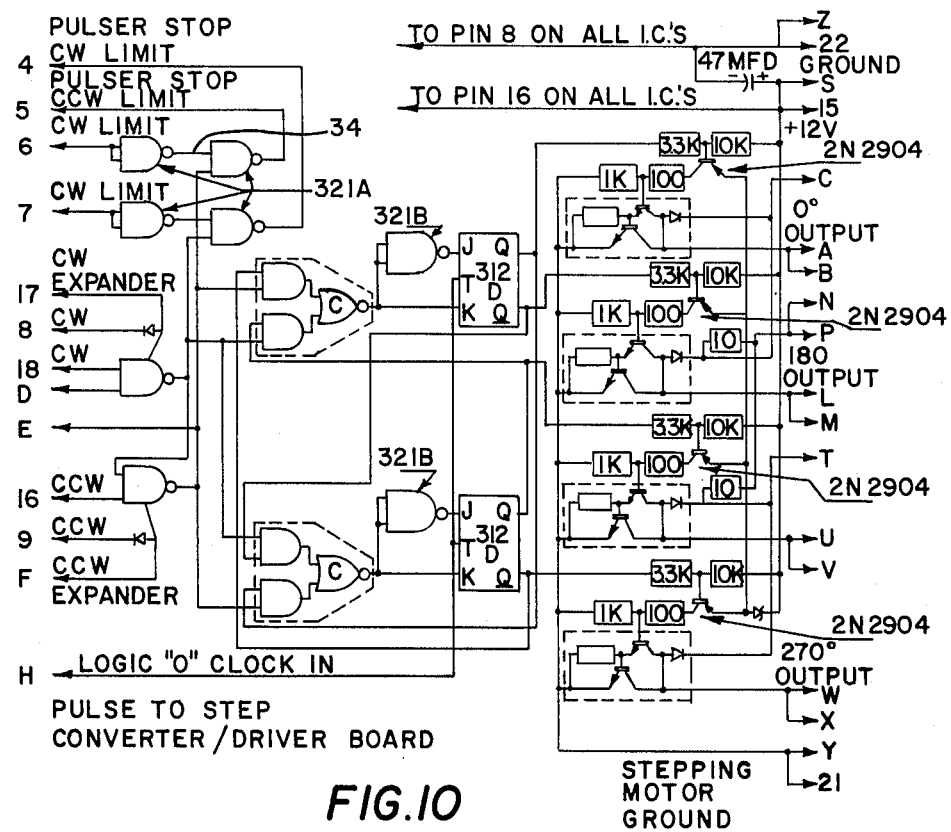
FIG. 10 shows electrical circuitry used in the circuit board of FIG. 9.

In FIGS. 9 and 10 it can be seen that the circuit board 34 contains the motor driver and the convertor elements.

Figure 11:
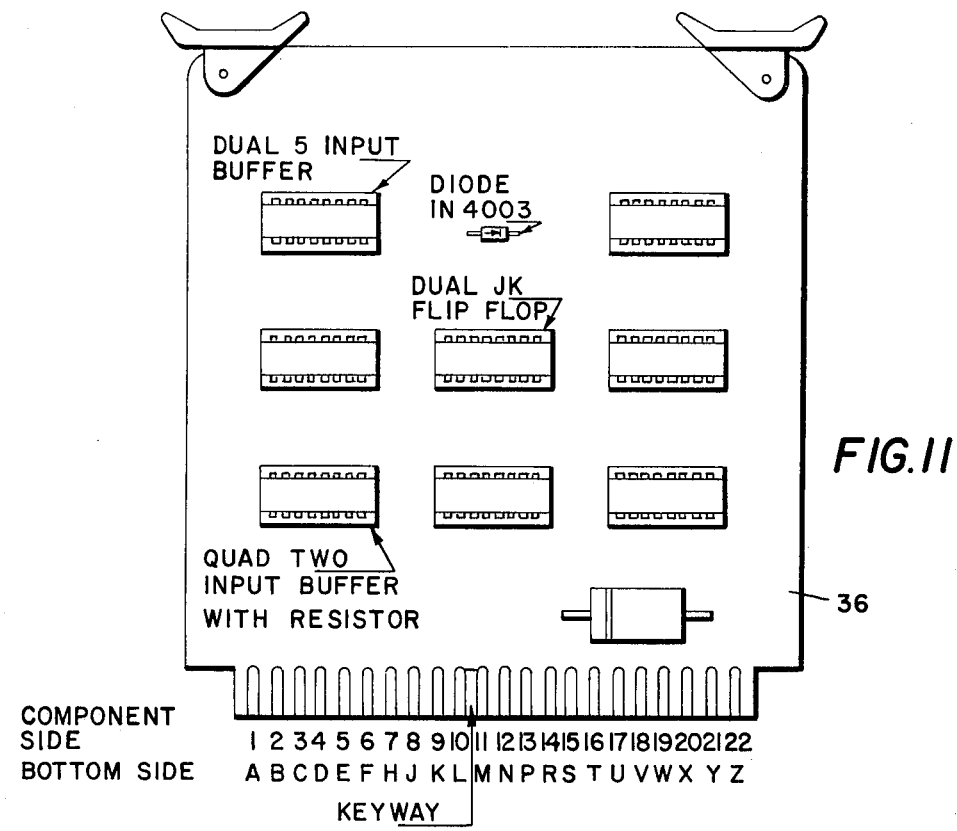
FIG. 11 is a front elevational view of the circuit board used in FIGS. 3B and 3C.
Figure 12:
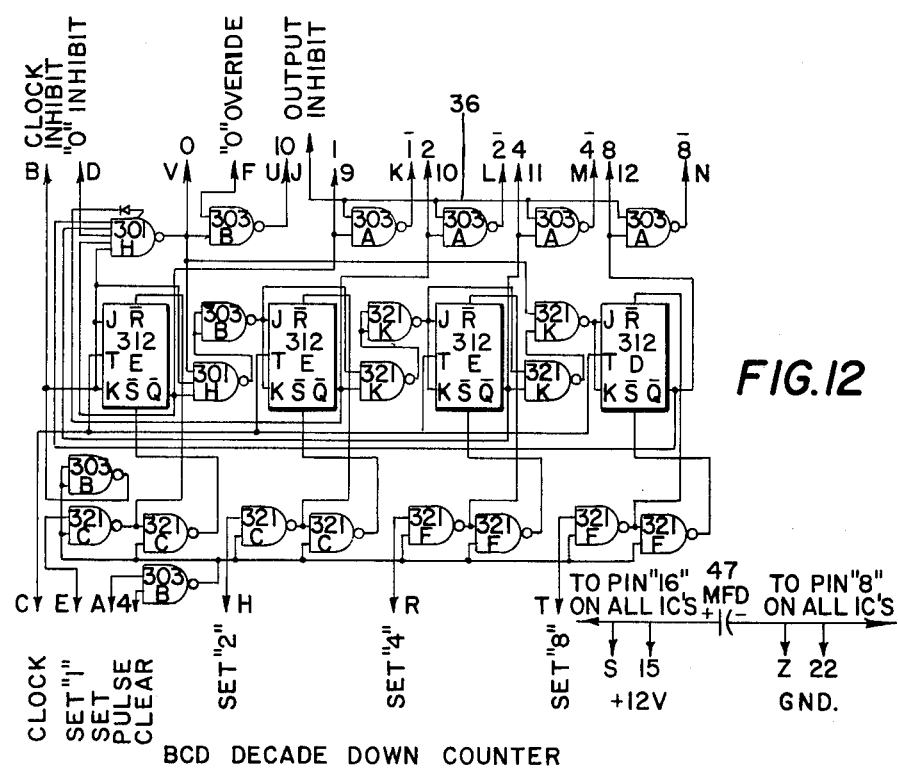
FIG. 12 shows electrical circuitry used in the circuit board in FIG. 11.

FIGS. 11 and 12 show that the circuit board 36 is a B.C.D. decade down counter, as is the circuit board $36^1$.

Figure 13:
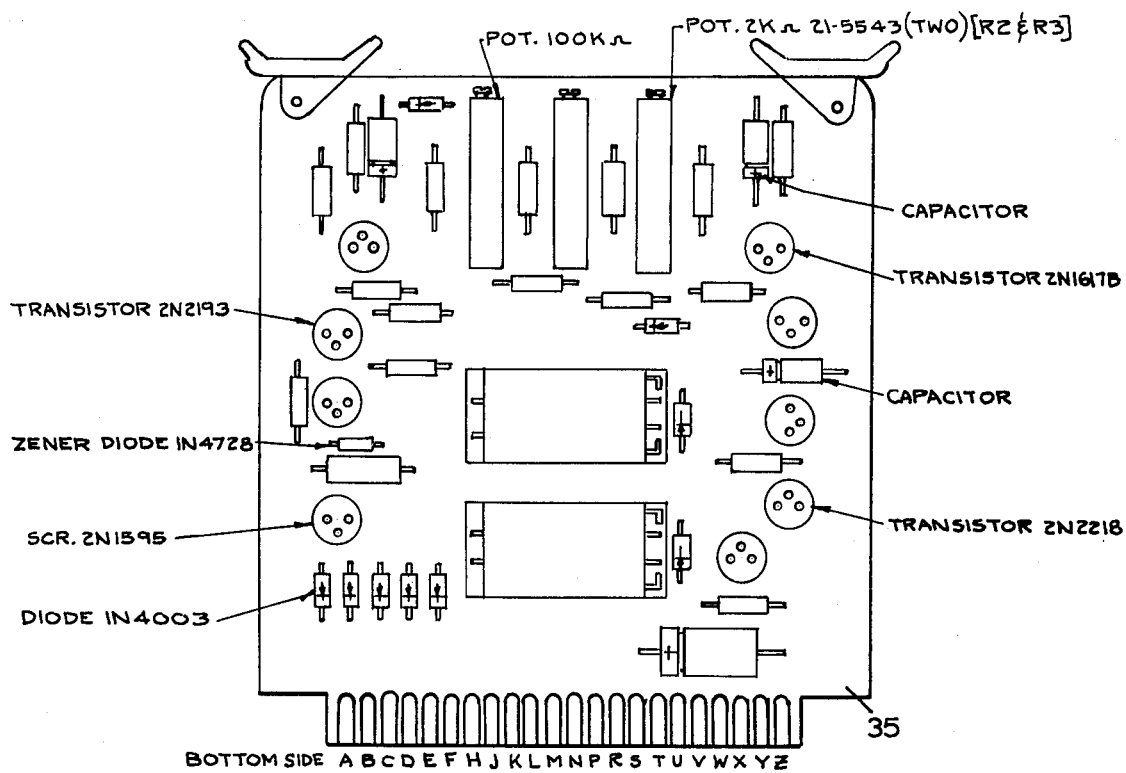
FIG. 13 is a front elevational view of a circuit board used in the circuitry shown in FIG. 3A.
Figure 14:
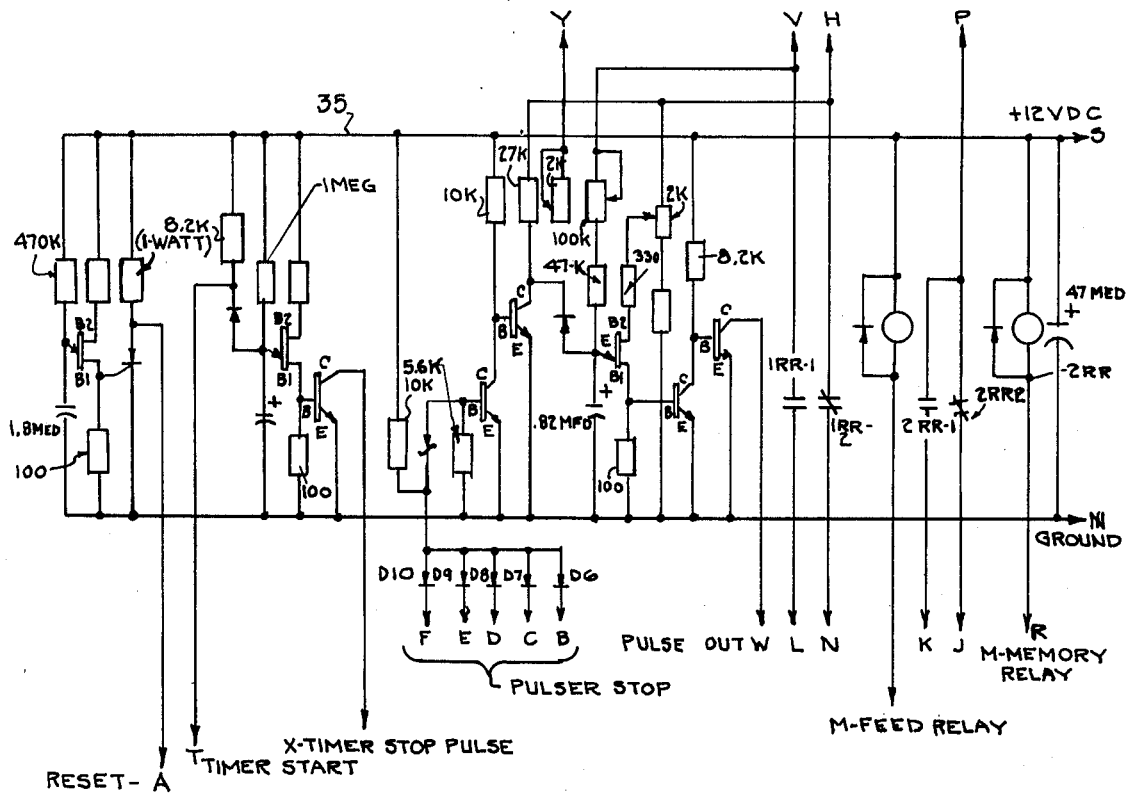
FIG. 14 shows the electrical circuitry used in the circuit board of FIG. 13.

FIGS. 13 and 14 show that the circuit board 35 is a pulser timer board.

Figure 15:
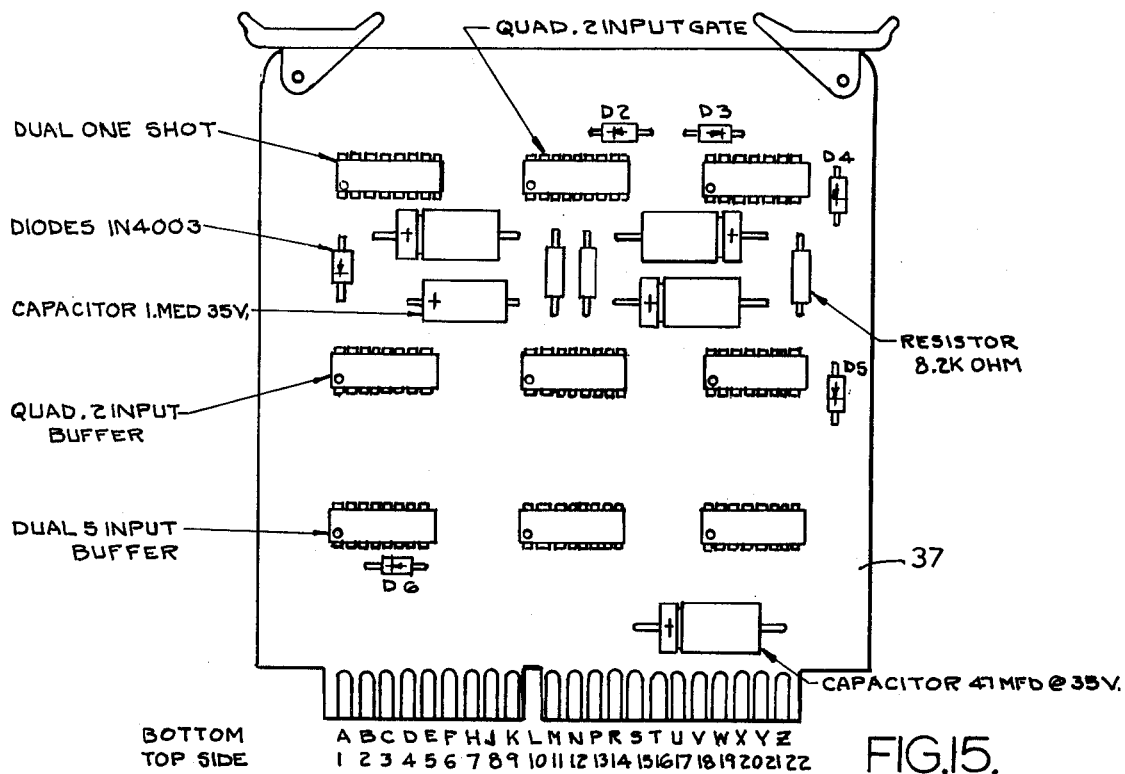
FIG. 15 is a front elevational view of a circuit board used in the electrical circuitry shown in FIG. 3B.
Figure 16:
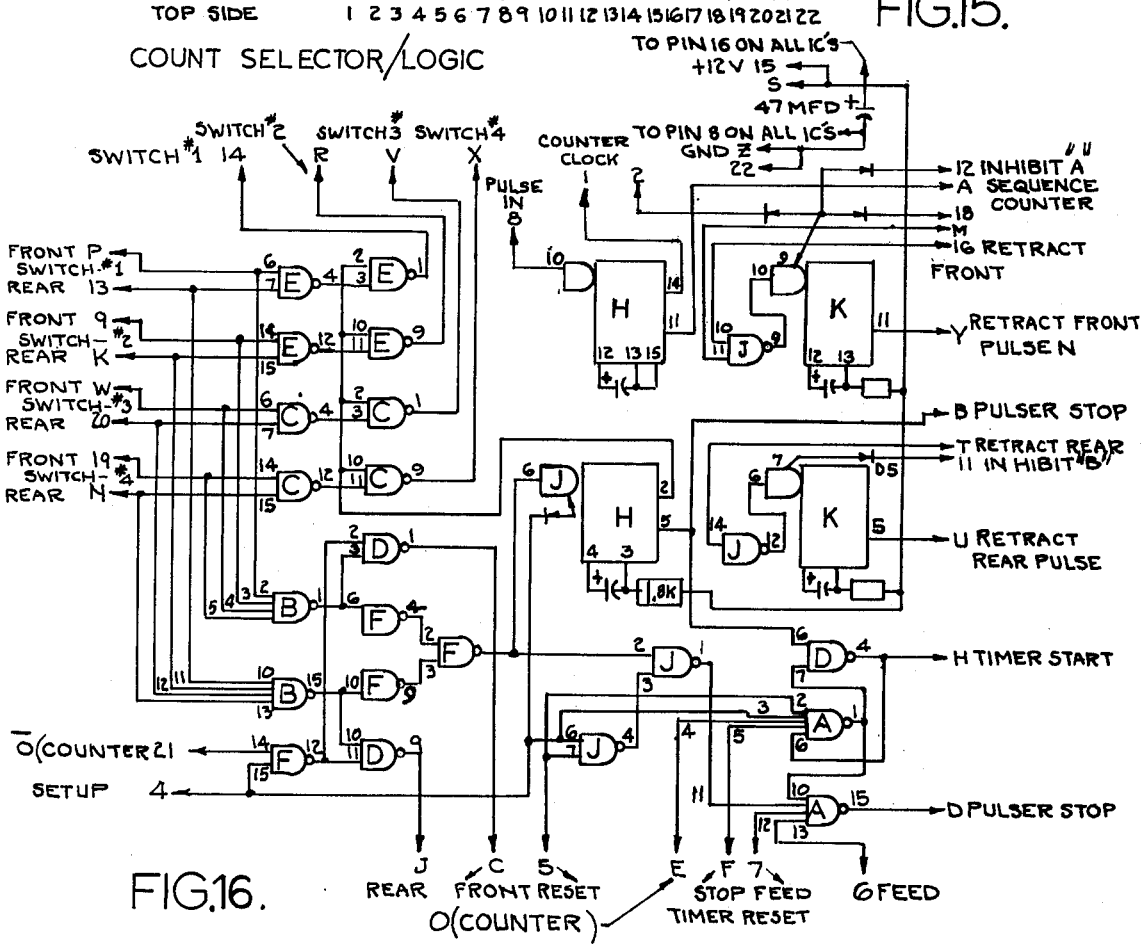
FIG. 16 shows the electrical circuitry used in the circuit board of FIG. 15.

FIGS. 15 and 16 show that the circuit board 37 is a count selector/logic board.

Figure 17:
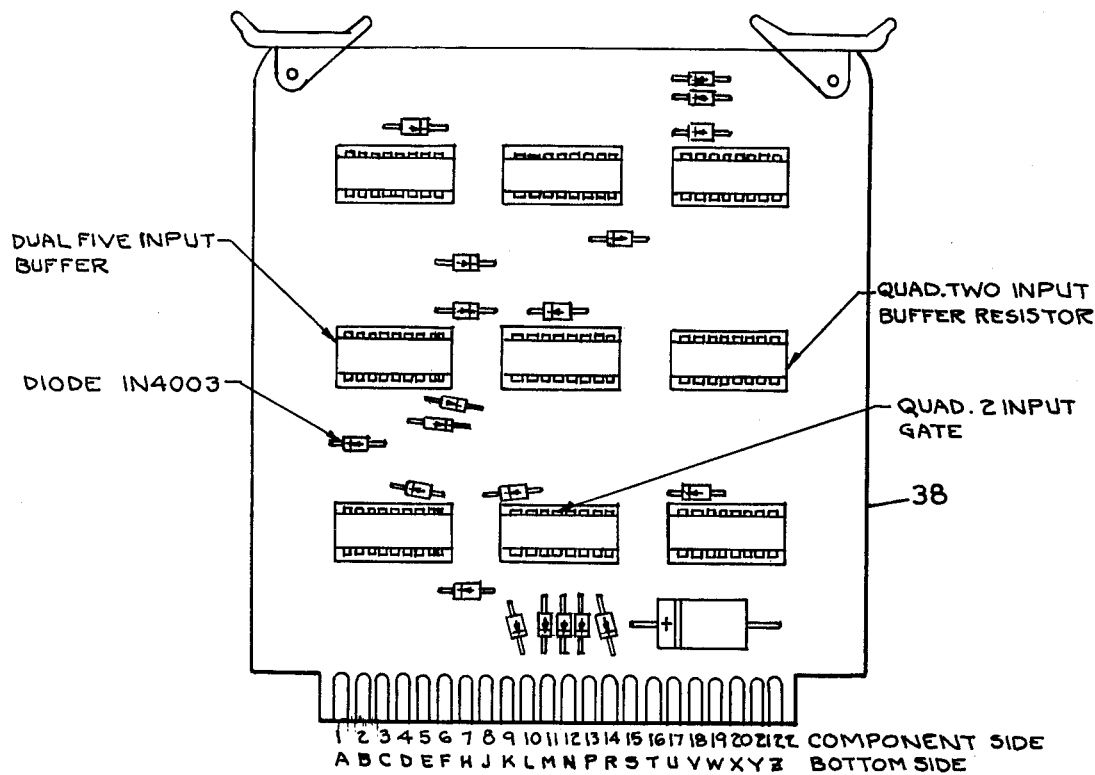
FIG. 17 is a front elevational view of circuit board used in electrical circuitry of FIG. 3C.
Figure 18:
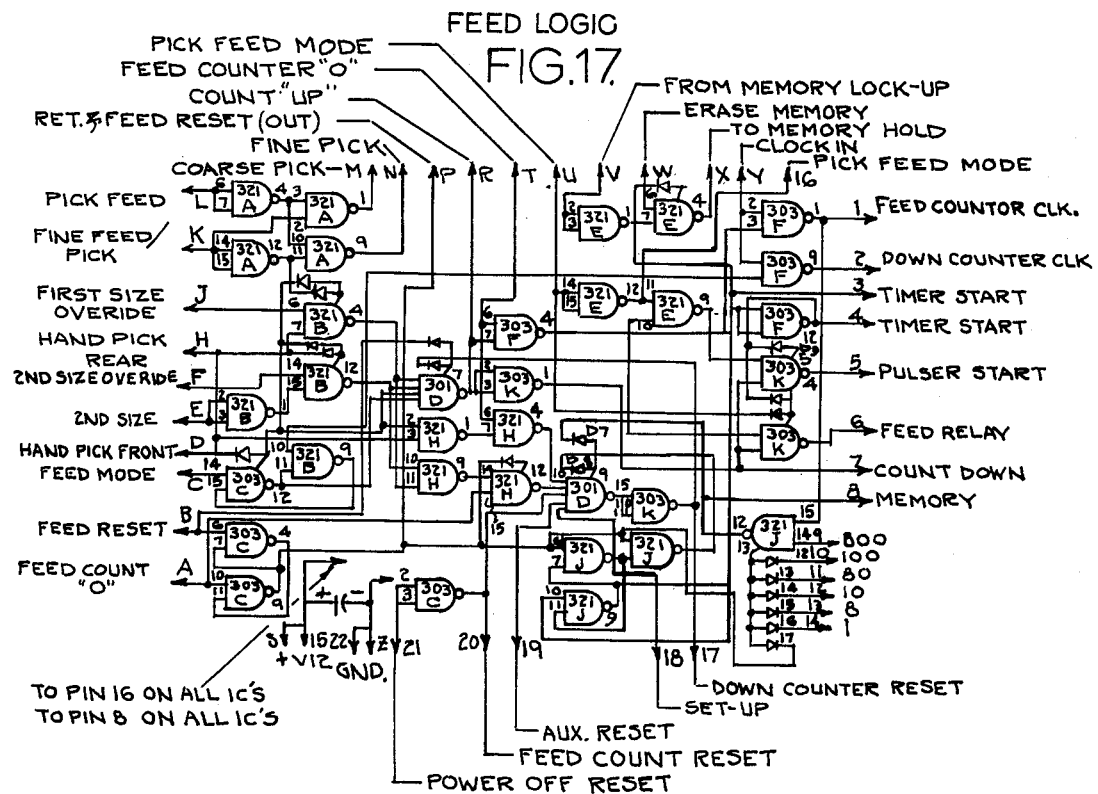
FIG. 18 shows the electrical circuitry used in the circuit board of FIG. 17.

FIGS. 17 and 18 show that the circuit board 18 is a fee logic board.

Figures 19, 20:
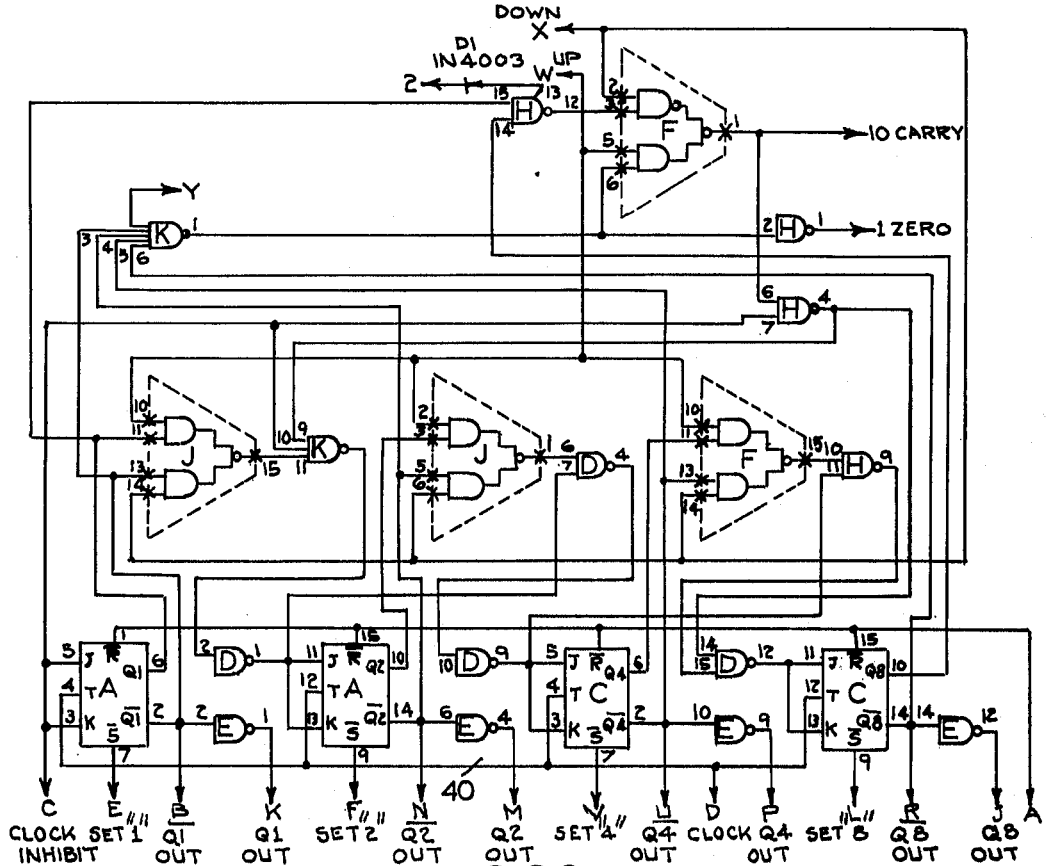
FIG. 19 is a front elevational view of a circuit board used in FIGS. 3F and 3G.
FIG. 20 shows the electrical circuitry used in the circuit board of FIG. 19.

FIGS. 19 and 20 show that the circuit board 40 is a B.C.D. down counter, as is the circuit board $40^1$.

Figure 21:
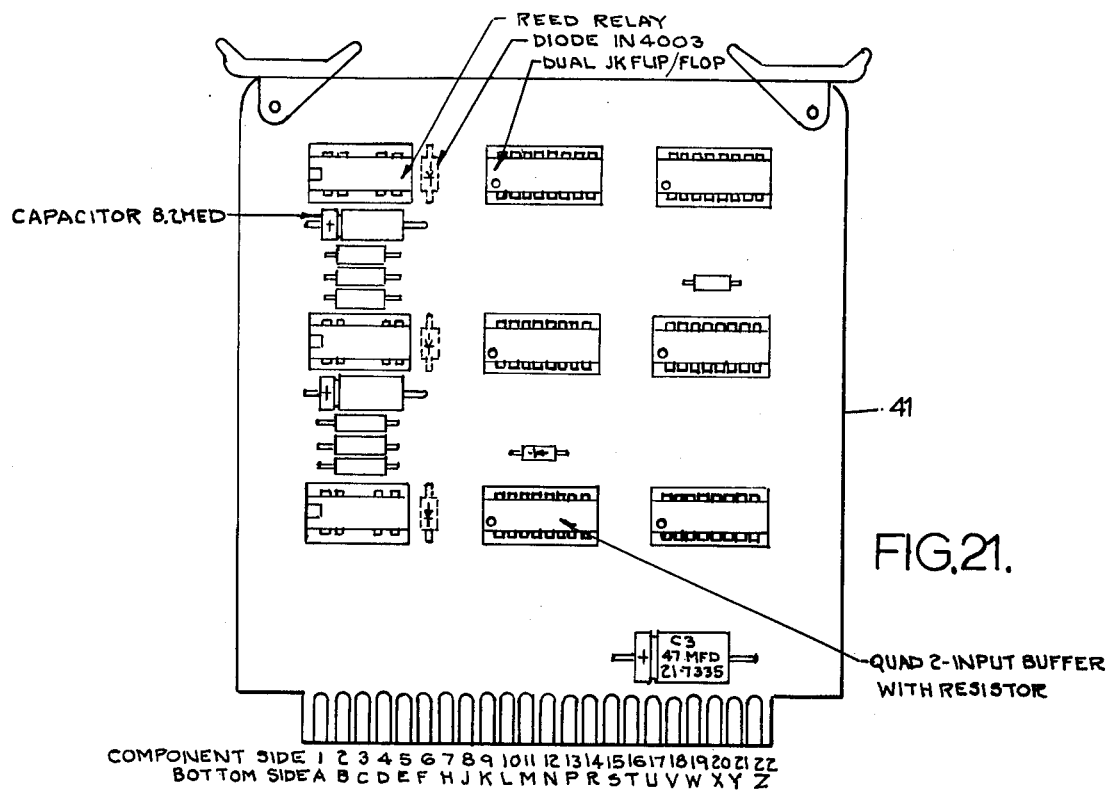
FIG. 21 is a front elevational view of a circuit board used in the electrical circuitry shown in FIG. 3H.
Figure 22:
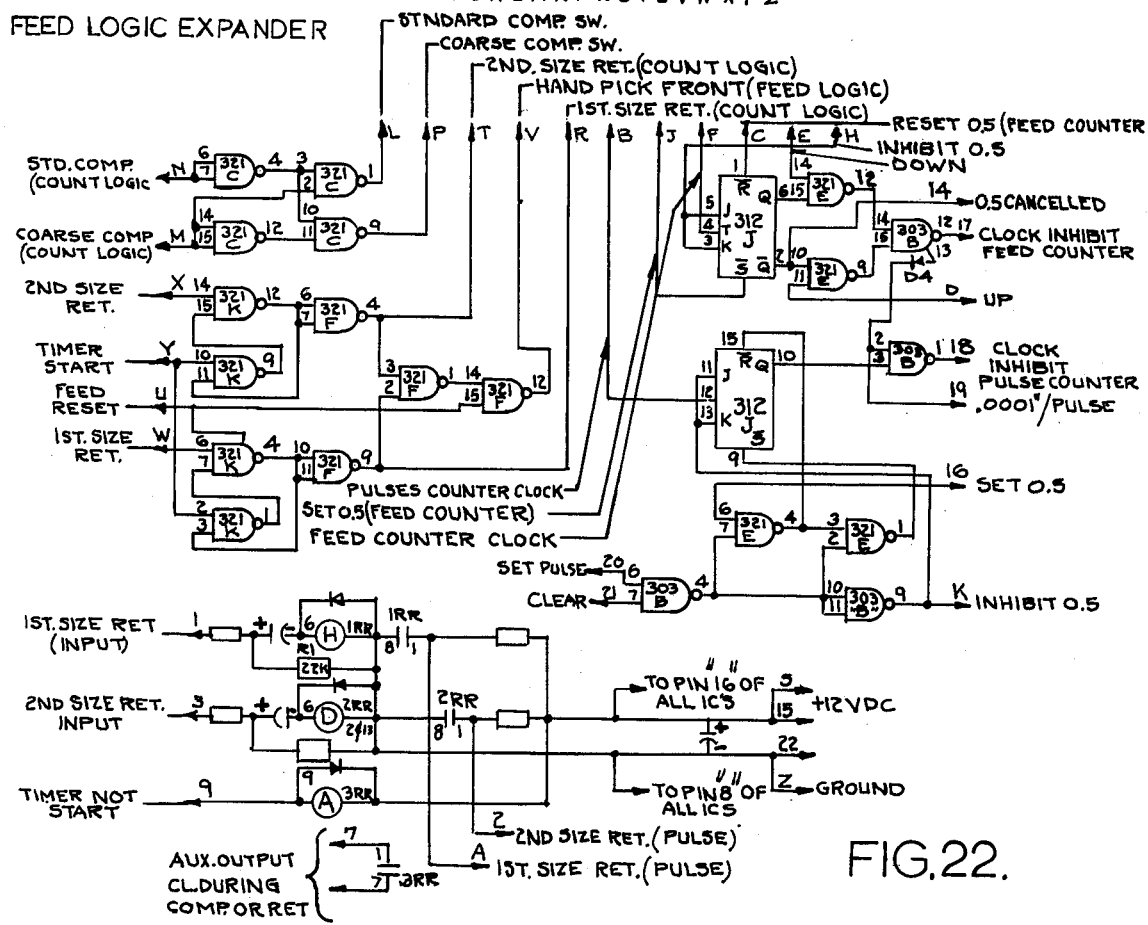
FIG. 22 shows the electrical circuitry used in the circuit board of FIG. 21.

FIGS. 21 and 22 show that the circuit board 41 is a feed logic expander.

FIGS. 23 and 24 show that the circuit board 42 is a counter memory, as is the circuit board $42^1$.

Figure 25:
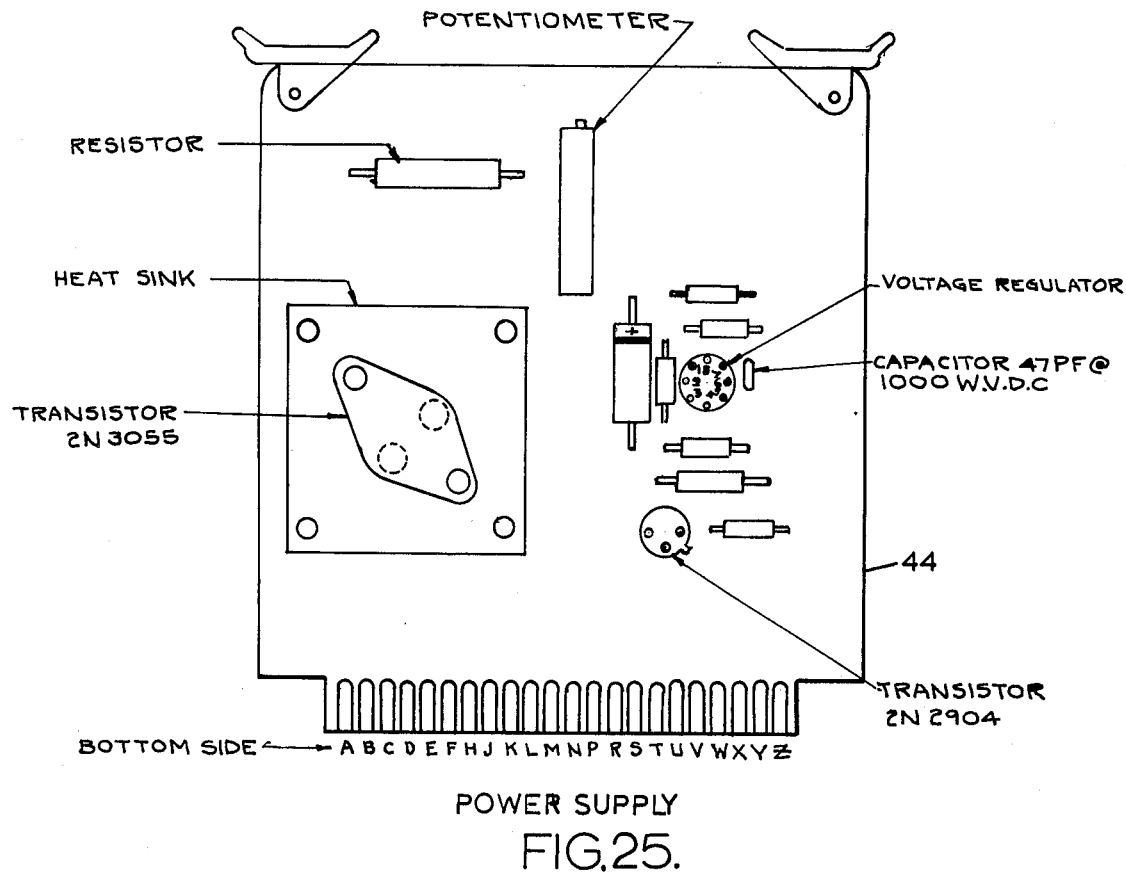
FIG. 25 is a front elevational view of a circuit board used in the electrical circuitry shown in FIG. 3M.
Figure 26:
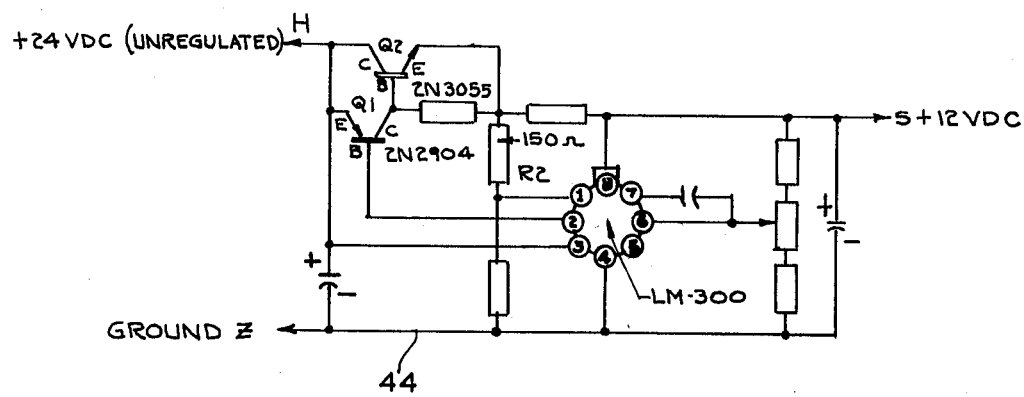
FIG. 26 shows the electrical circuitry used in the circuit board of FIG. 25.

FIGS. 25 and 26 show that the circuit board 44 is a 12 volt d.c. regulator.

Figure 27:
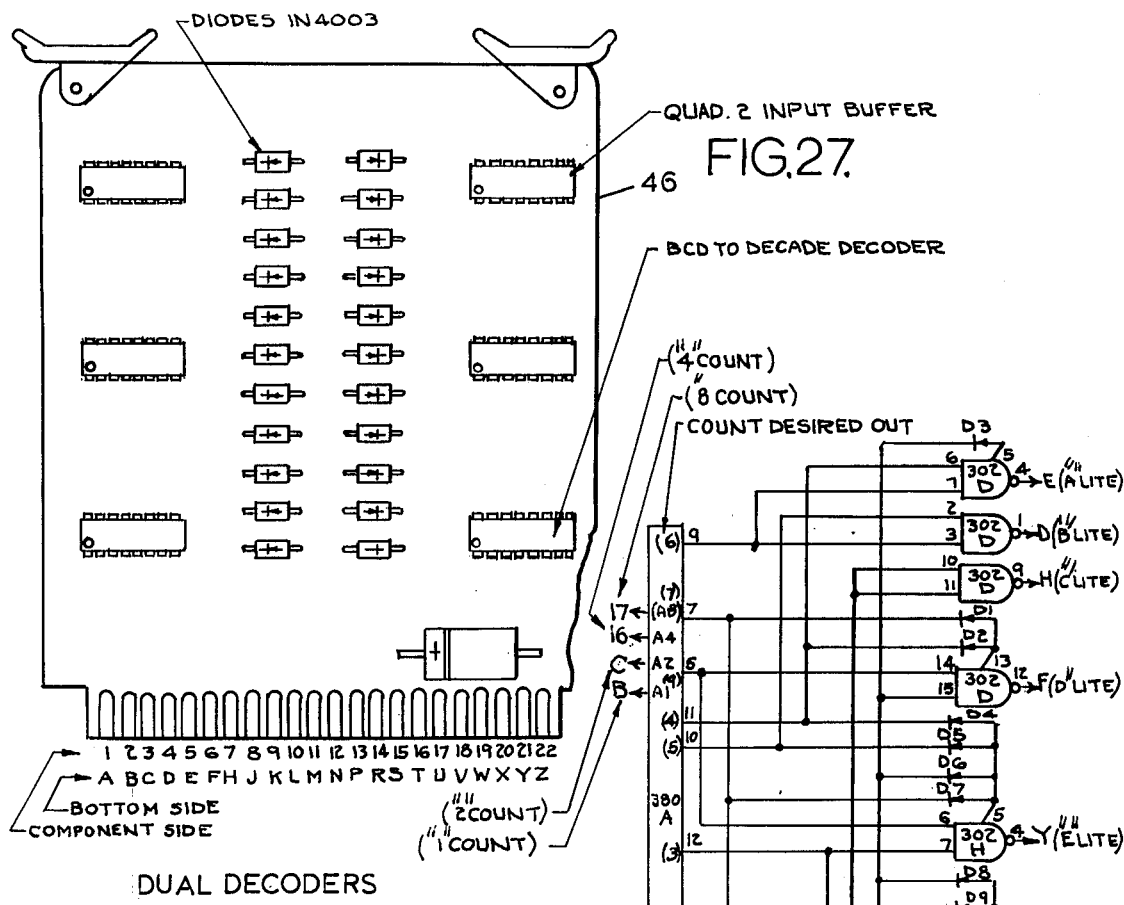
FIG. 27 is a front elevational view of the circuit board used in the electrical circuitry shown in FIG. 3N.
Figure 28:
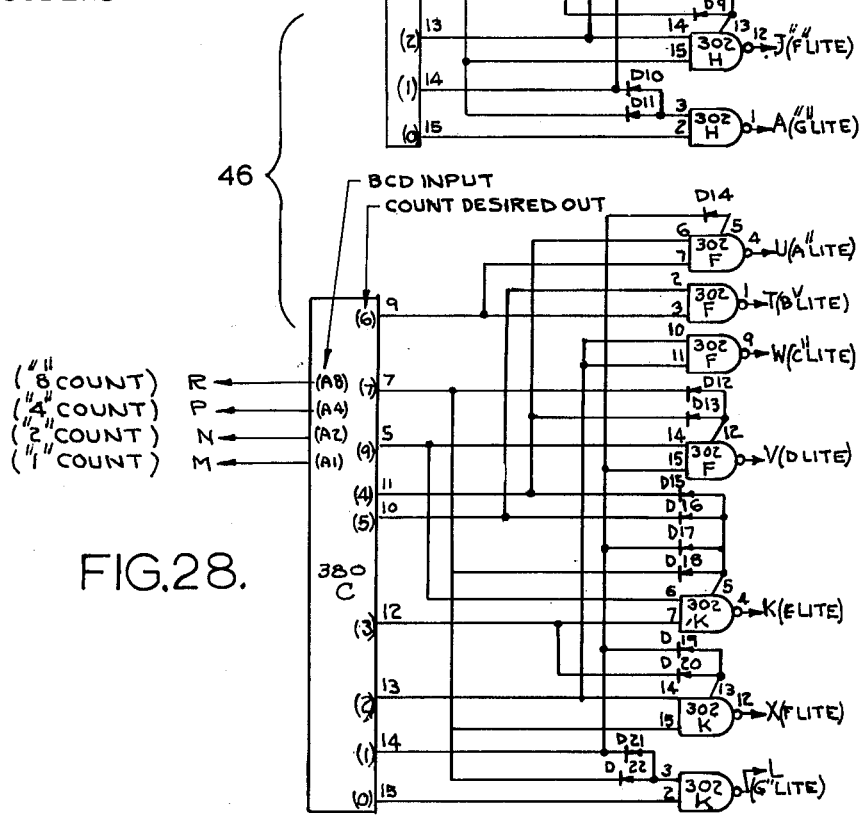
FIG. 28 shows the electrical circuitry used in the circuit board of FIG. 27.

FIGS. 27 and 28 indicate that the circuit board 46 is a B.C.D. decimal decoder, as is the circuit board $46^1$.

Figure 29:
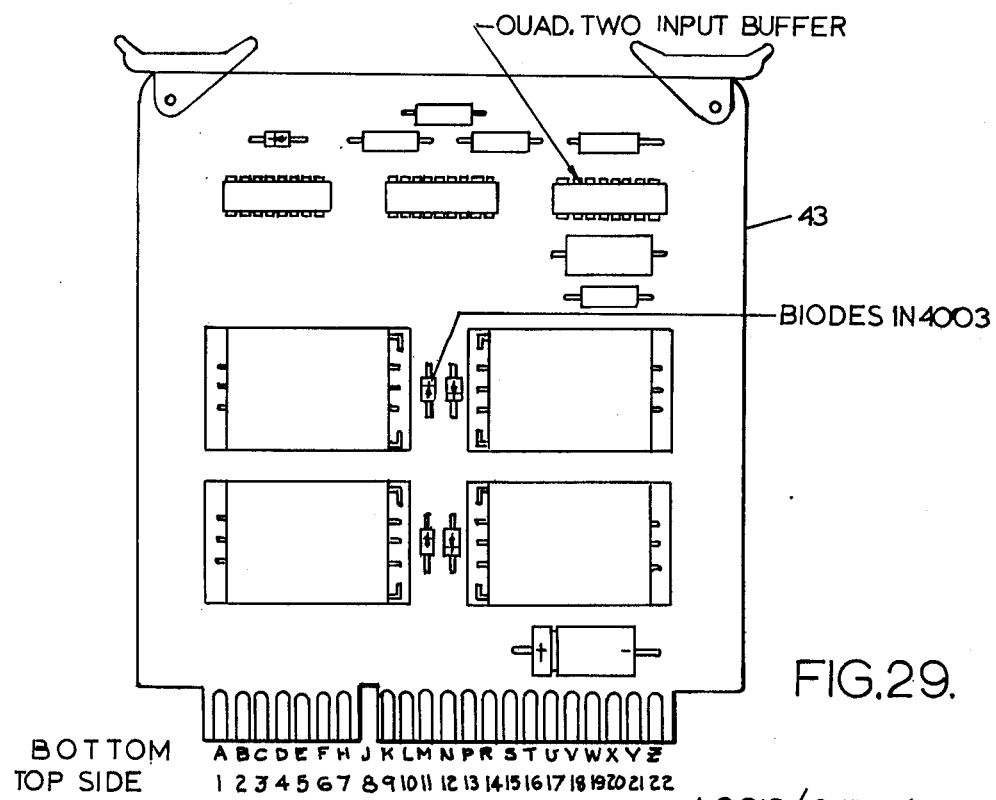
FIG. 29 is a front elevational view of the circuit board used in the electrical circuitry shown in FIG. 3L.
Figure 30:
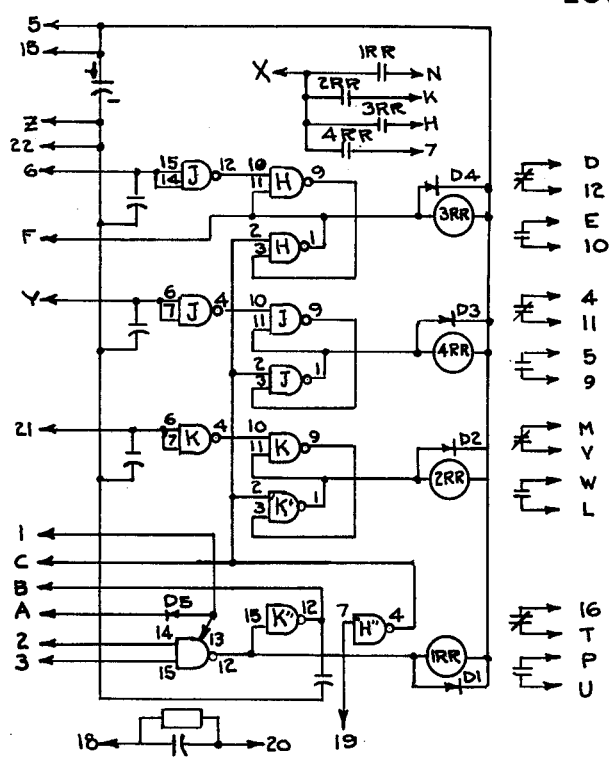
FIG. 30 shows the electrical circuitry used in the circuit board of FIG. 29.
Figure 30:
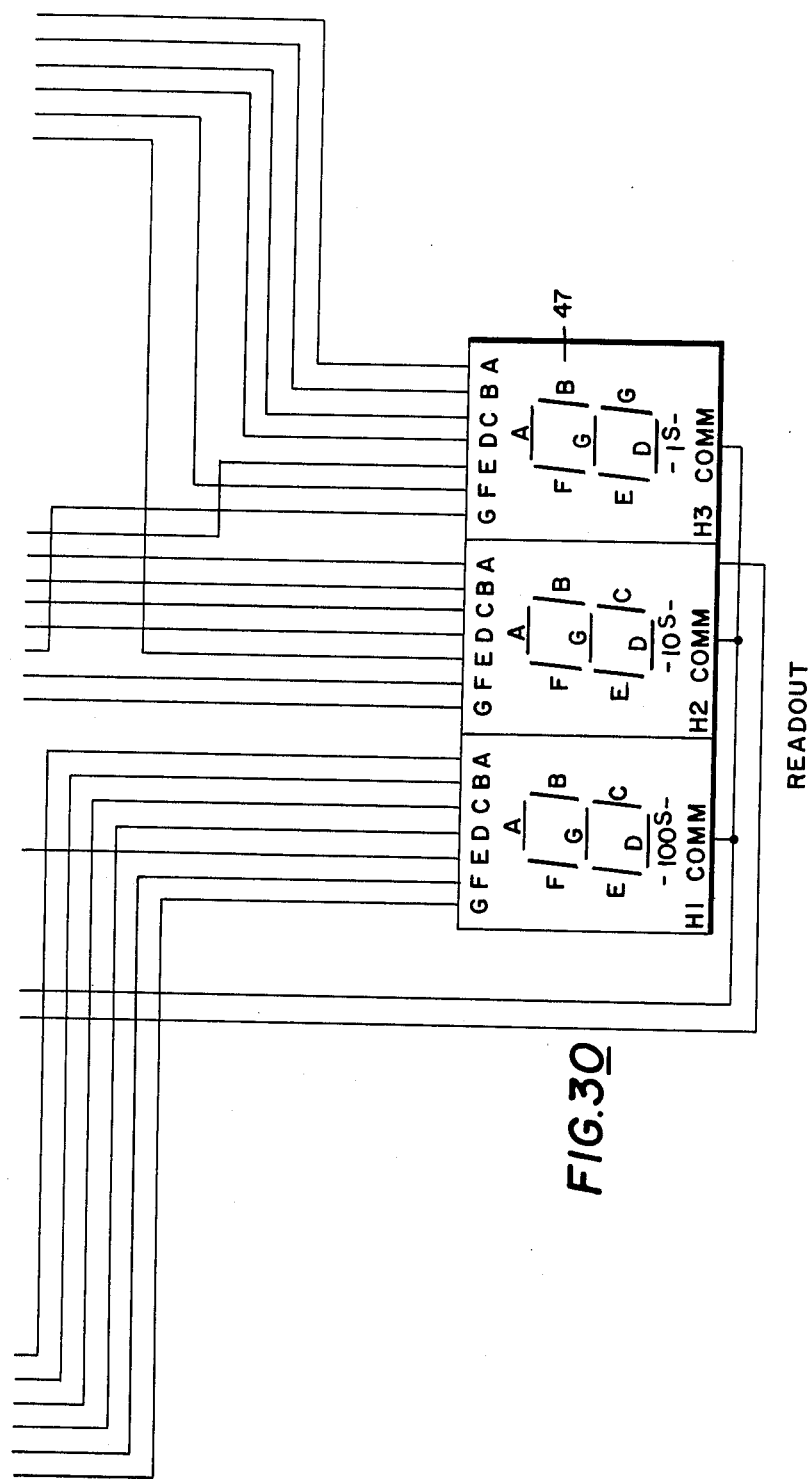

FIGS. 29 and 30 shows that the circuit board 43 is a logic output board.

Figures 31, 32:
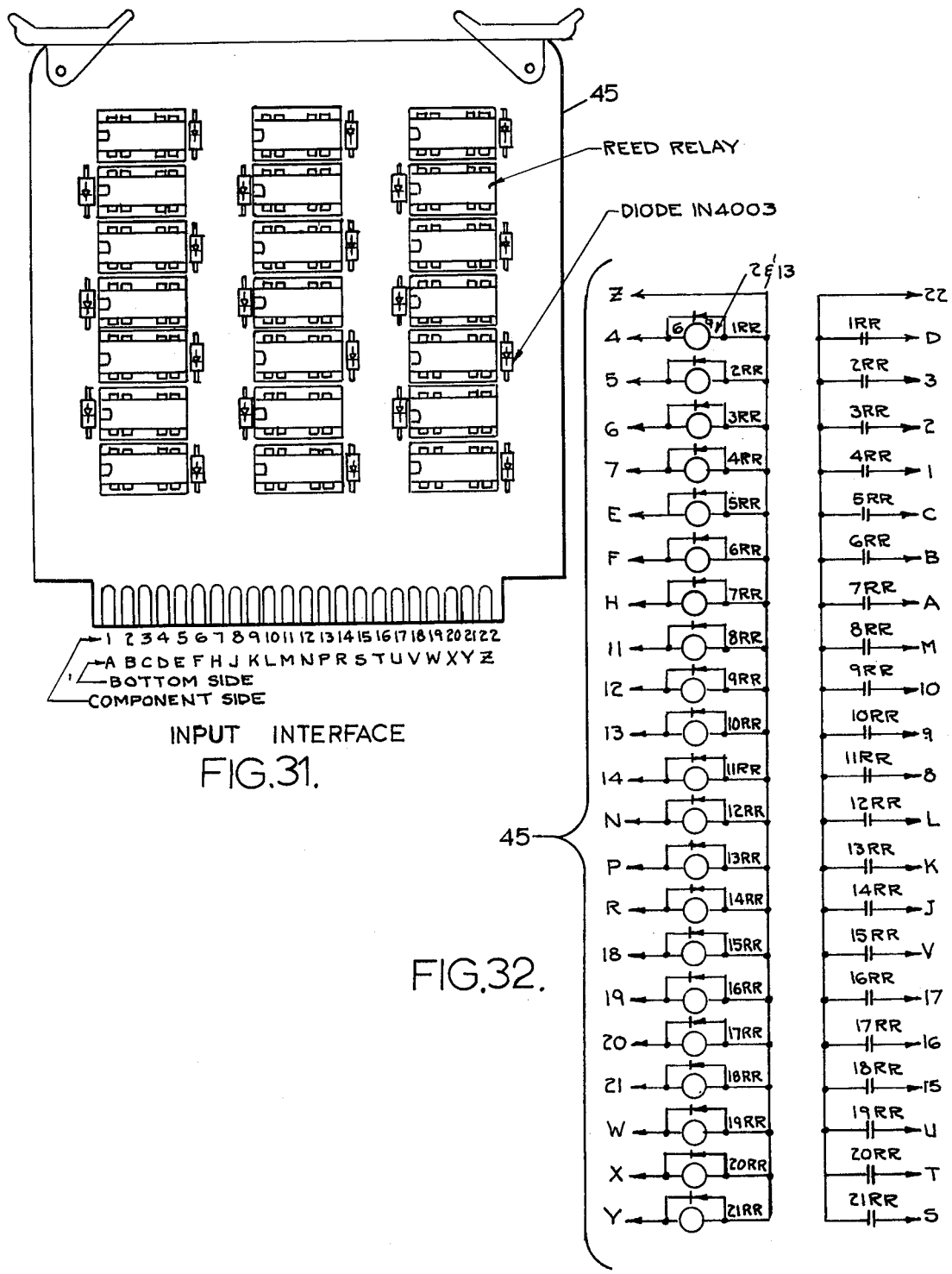
FIG. 31 is a circuit board used in the electrical circuitry shown in FIG. 3M.
FIG. 32 shows the electrical circuitry used in the circuit board of FIG. 31.

FIGS. 31 and 32 show that the circuit board 45 is an input interface board.

Figure 33:
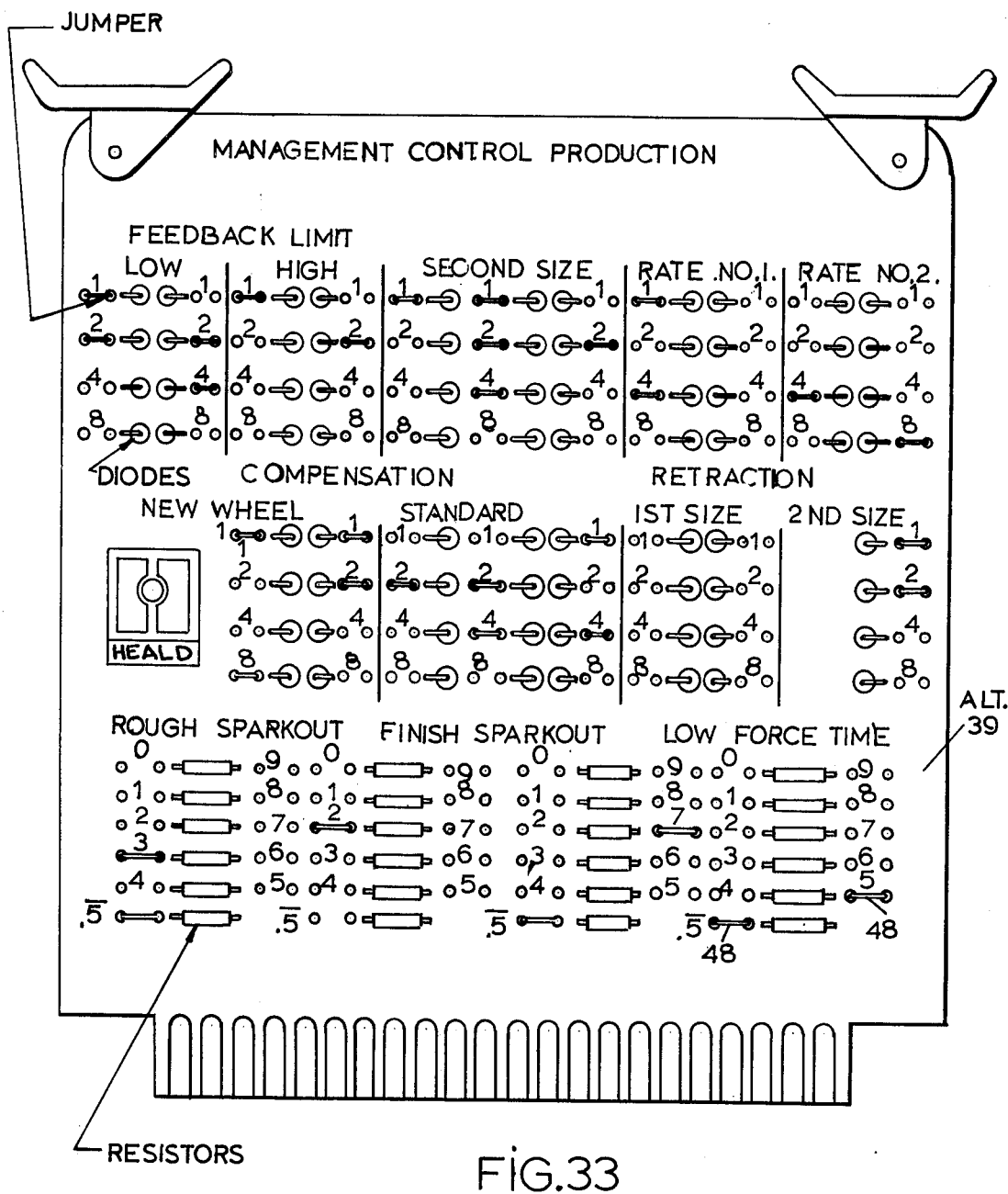
FIG. 33 is a front elevational view of a circuit board representing a modified form of the invention.

In the operation of the grinding machine just described, the functions served by the adjustable elements 29, 30, 31, 32, 24, 33 and 25 are in use during the grinding cycle. These functions are as follows:
 New wheel compensation
 Standard compensation
 First-size retraction
 Second-size retraction
 First-size gauge release
 Intermediate-size low limit
 Final-size high limit Referring now to FIG. 33, it can be seen that the management control circuit board 39 ALT. is intended for use in place of the management control circuit board 39 in the circuitry of FIG. 3. Actually the circuitry of FIG. 3 would have to be modified because of the fact that connections are made to adjustable elements related to the grinding machine function other than have been described in connection with FIG. 3. In the case of the circuit board of FIG. 33, the board is set up to take care of the situation where the grinding machine uses almost all of the functions available on the control panel 17. The circuit board 39 provides all the functions available except FIRST SIZE GAUGE RELEASE, INTERMEDIATE-SIZE LOW LIMIT, and FINAL-SIZE HIGH LIMIT.

Figure 7:
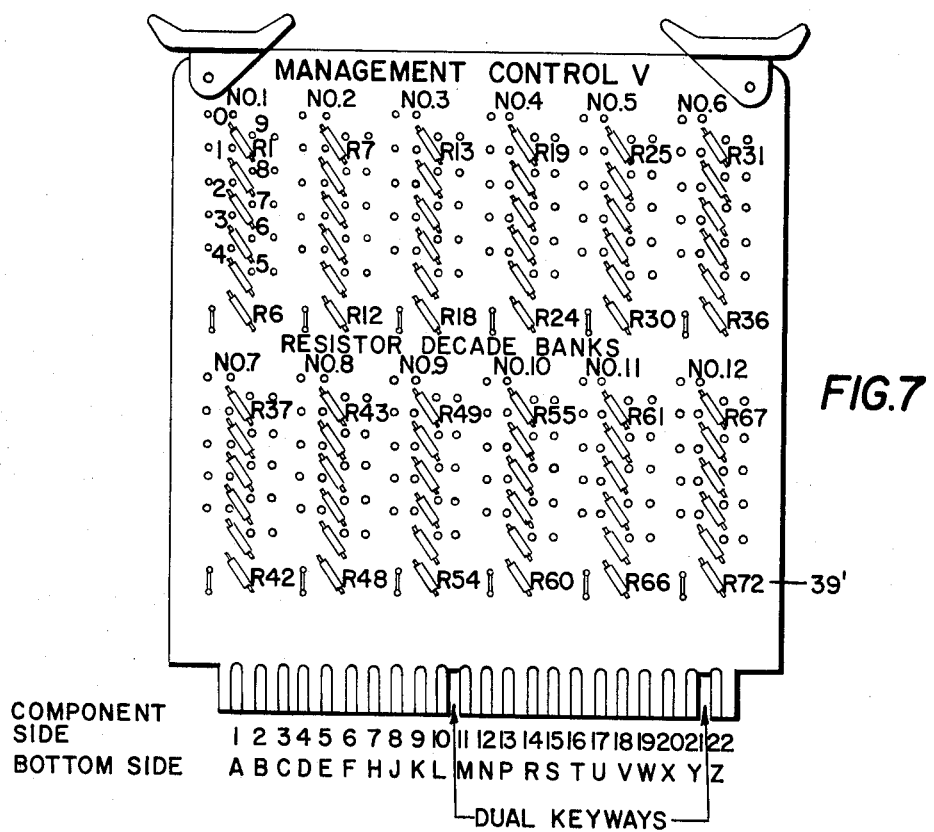
FIG. 7 is a front elevational view of another circuit board.
Figure 8:
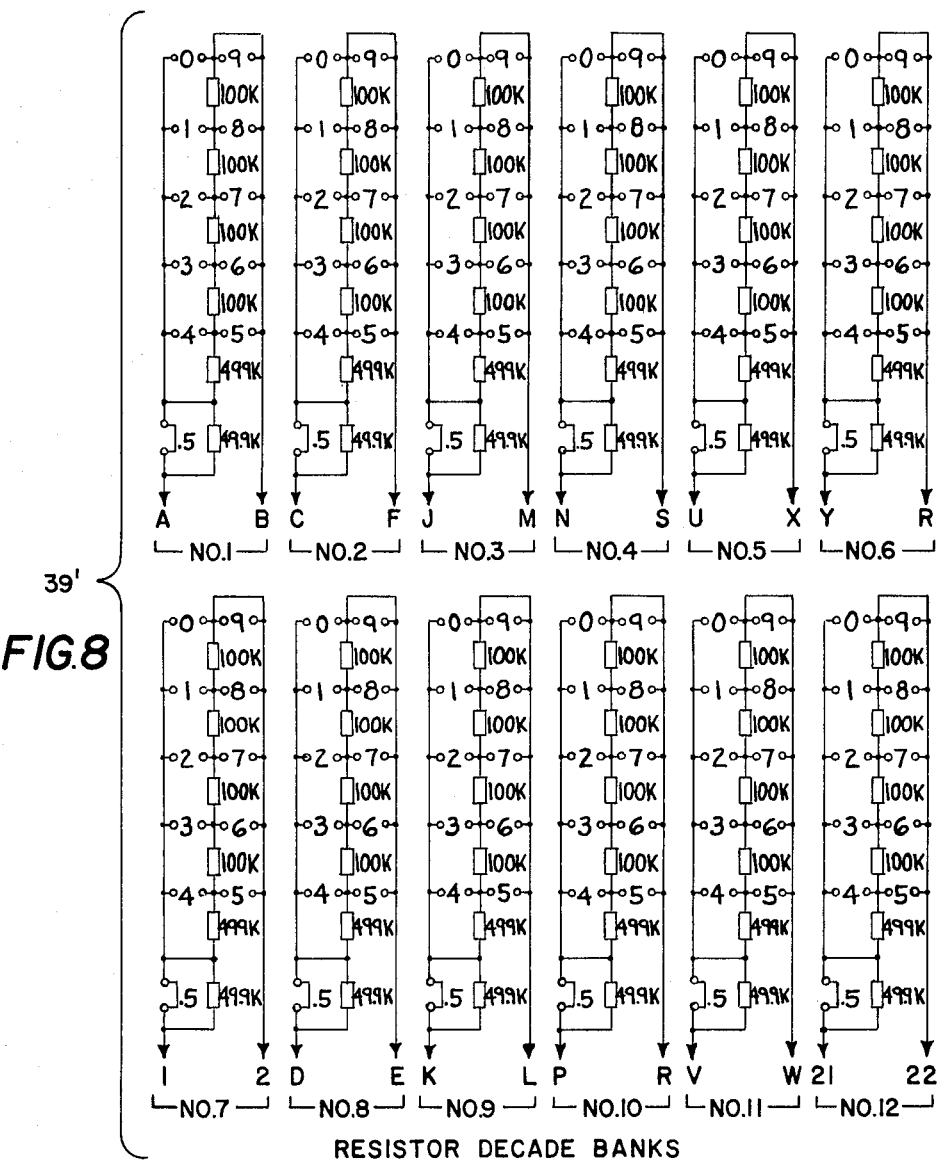
FIG. 8 shows the electrical circuitry used in the circuit board of FIG. 7.

The board associated with the circuit board 39 is similar to the circuit board $39^1$ shown in FIGS. 7 and 8 providing desirable resistors. The jumper wires 48 are used to connect the resistors and diodes on the circuit board in accordance with the binary number system. For instance, the board shown in the illustration is programmed to give the following values:
 Feed-back limit-low 36
 Feed-back limit-high 12
 Second size 1.72
 Rate #1 56
 Rate #2 48
 New wheel compensation 93
 Standard compensation 2.65
 First-size retraction 42

Second-size retraction 7
Rough spark-out time 3 seconds
Finish spark-out time 2.5 seconds
Finishing time 7 seconds
Low-force time 5 seconds The control board 39 not only prevents the timer potentiometers on the control panel 17 from being operative, but also prevents the cross-slide control switches from having any effect on the machine cycle. The output required for these controls are programmed on the board by placing the jumpers 48 in the proper place. When it is desirable to operate the machine by use of the adjustable elements, this board is replaced by a board similar to the board 39 setup shown in FIG. 4, suitable modification being made to take care of the different step of functions served. It will be understood, of course, that, when the feed-back function is used, an after gauge arrangement is associated with the grinding machine and feeds back indications of necessary variations of workpiece size from a desired standard.

Figure 34:
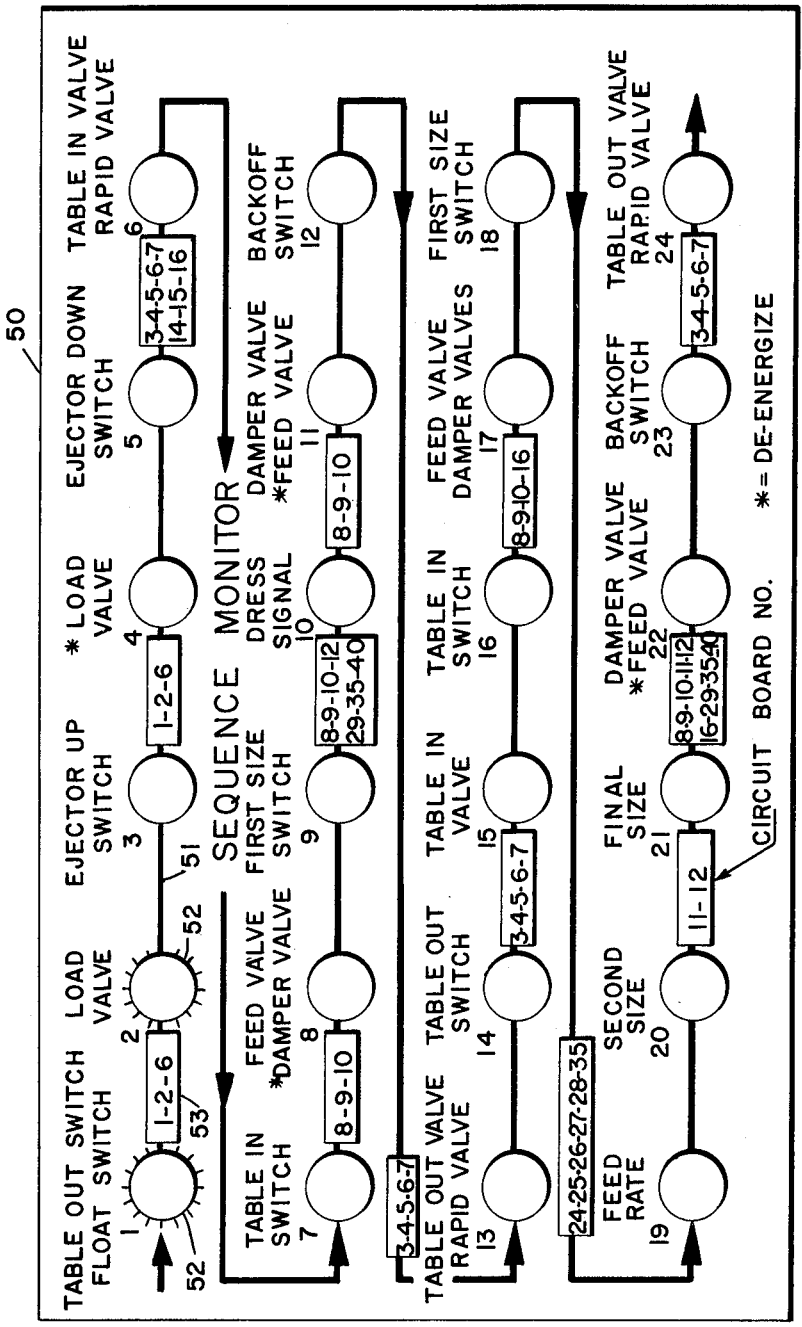
FIG. 34 is an enlarged view of a display panel mounted on the front of the machine.
Figure 35:
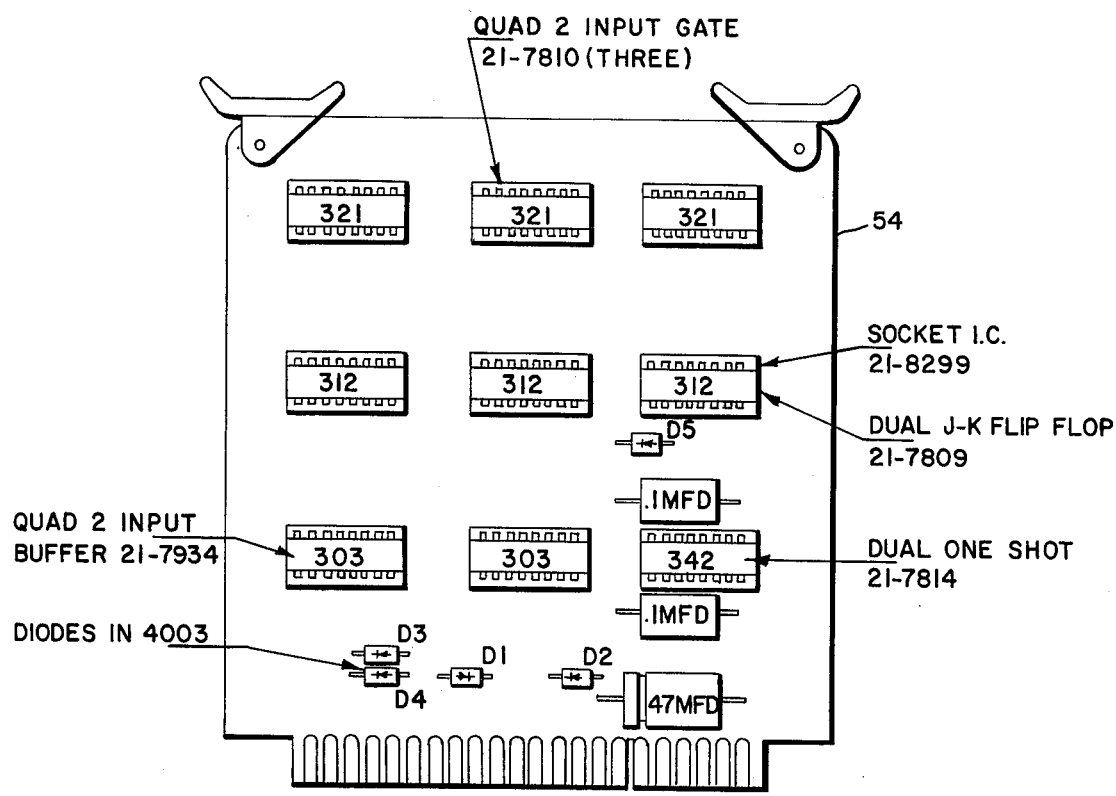
FIGS. 35 and 36 illustrate, respectively, the physical and electrical characteristics of a circuit board connected to the display panel.
Figure 36:
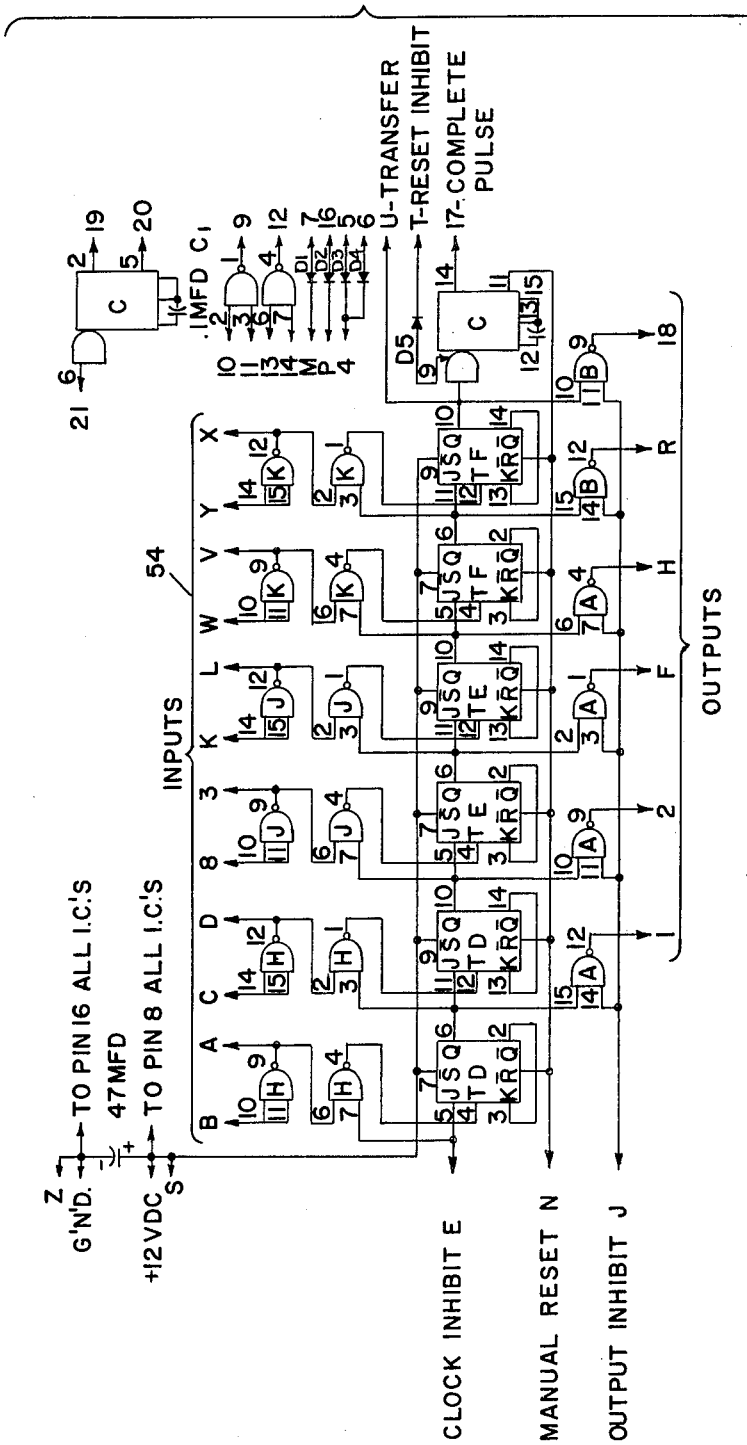

FIG. 1 shows on the face of the grinding machine 10 a SEQUENCE MONITOR display panel 50 whose details are shown in FIG. 34. The panel is provided with indicia including a sequence path 51 along which are enumerated the various events taking place during the grinding cycle, such as TABLE OUT SWITCH, FLOAT SWITCH, LOAD VALVE, EJECTOR UP SWITCH, etc. Adjacent the listing of each event is a lamp 52 which is illuminated as its associated event takes place. In the grinding machine illustrated, there are 24 lamps 52 associated with 24 events. Between the lamps 52 in the path 51 are located plates, similar to the plate 53, which list the circuit boards that take part in the event that is supposed to be taking place in the grinding machine. The lamps 52 are connected to and serviced by a circuit board 54 whose physical appearance is indicated in FIG. 35 and whose electrical circuitry is shown in FIG. 36. In the preferred embodiment the display unit is made up of a power supply, an interface logic relay board, and four of the sequencer circuit boards. Each board is arranged to accept 6 input signals and give 6 output signals, giving a total of 36 combinations per board. The purpose of the combination is to display on the light panel the sequence of events that should take place on the grinding machine. The main function of the unit is as a trouble shooter assistance for locating accurately any trouble. The difficulty could be the fault of a limit switch, a pressure switch, or a particular circuit board. If the grinding machine malfunctions, the operator can observe the light panel which will indicate the next function that should have taken place. In addition, a diagram similar to FIG. 1 is mounted on the inside cover of the box containing the circuit boards. Not only does the diagram separate the various steps, events, and functions associated with the operation of the machine into easily-identifiable units or boxes, but it also indicates the particular board or boards that are responsible for that function. If a function fails to occur, the repairman simply replaces the listed board and the machine instantly begins operating properly again. The board that has been removed can be tested and, perhaps, repaired, but the grinding machine is not out of operation.

Figure 37:
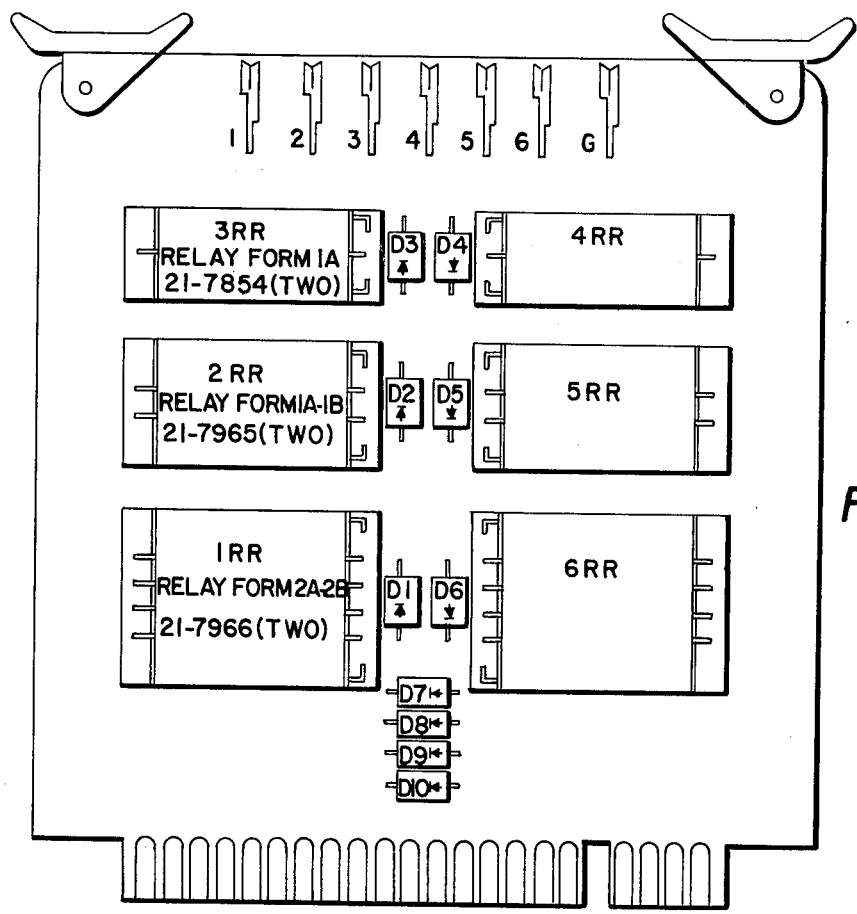
FIGS. 37 and 38 illustrate, respectively, the physical and electrical characteristics of a typical circuit board used in connection with the control of the machine.
Figure 38:
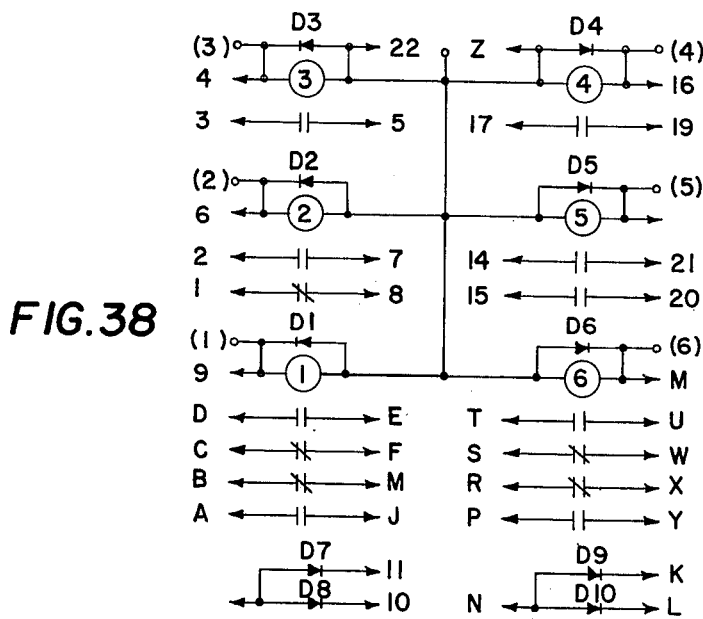

FIGS. 37 and 38 show, respectively, the physical appearance and the electrical circuitry of a typical circuit board fulfilling one of the functions set forth in the "boxes" shown in FIG. 1 under "CYCLE LOGIC." Each board mounts six relays. Two have one normally-open contact, two with one Form A and one Form B. Two relays have two Form A and two Form B. This gives a total of 6 inputs and 14 outputs (six normally-closed and eight normally-open) arranged in such a manner that the block diagram type of identification can be used. This takes the place of complicated elementary type diagrams formerly used for trouble shooting of grinding machines.

It is obvious that minor changes may be made in the form and construction of the invention without departing from the material spirit thereof. It is not, however, desired to confine the invention to the exact form herein shown and described, but it is desired to include all such as properly come within the scope claimed.

We claim:

1. A grinding machine for generating a surface of revolution on a workpiece by use of an abrasive wheel, comprising
    (a) a base,
    (b) a workhead mounted on the base for supporting and rotating the workpiece about the axis of the surface of revolution,
    (c) a wheelhead mounted on the base for supporting and rotating the abrasive wheel about its axis,
    (d) a feed box containing electrical circuitry for controlling relative movement of the workhead and wheelhead both parallel to and perpendicular to the said axis of the surface of the revolution in accordance with a predetermined sequence of events significant to a human operator to produce a grinding cycle,
    (e) a display panel having indicia showing in linear sequential arrangement the sequence of events normally taking place in the machine, there being lamps mounted on the panel and located at the indicia indicating the various events,
    (f) circuit means located in the feed box and connected to the lamps to actuate a specific lamp at the time that is associated event takes place and to deactivate said lamp when the associated event fails to take place, said circuit means in the feed box being carried on circuit boards, each event being controlled by at least one circuit board, so that, when a lamp associated with a given event fails to be actuated, the circuit board associated with that event can be replaced, and
    (g) a diagram mounted on the machine adjacent the circuit boards, the diagram representing the various events in block form and indicating which circuit board controls each event.

* * * * *